(12) United States Patent
Zheng

(10) Patent No.: US 12,301,440 B2
(45) Date of Patent: May 13, 2025

(54) SEGMENT ROUTING METHOD AND APPARATUS

(71) Applicant: HUAWEI TECHNOLOGIES CO., LTD., Guangdong (CN)

(72) Inventor: Ruobin Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 700 days.

(21) Appl. No.: 17/686,798

(22) Filed: Mar. 4, 2022

(65) Prior Publication Data

US 2022/0231948 A1 Jul. 21, 2022

Related U.S. Application Data

(63) Continuation of application No. PCT/CN2020/113260, filed on Sep. 3, 2020.

(30) Foreign Application Priority Data

Sep. 4, 2019 (CN) .......................... 201910834195.2

(51) Int. Cl.
*H04L 45/7453* (2022.01)
*H04L 45/00* (2022.01)
*H04L 45/037* (2022.01)
*H04L 45/0377* (2022.01)
*H04L 45/76* (2022.01)

(52) U.S. Cl.
CPC ........ *H04L 45/037* (2022.05); *H04L 45/0377* (2022.05); *H04L 45/34* (2013.01); *H04L 45/7453* (2013.01); *H04L 45/76* (2022.05)

(58) Field of Classification Search
CPC ... H04L 45/037; H04L 45/0377; H04L 45/34; H04L 45/7453; H04L 45/76

USPC ......................................................... 370/392
See application file for complete search history.

(56) References Cited

U.S. PATENT DOCUMENTS

2019/0215267 A1  7/2019  Filsfils et al.

FOREIGN PATENT DOCUMENTS

| CN | 102857422 A | 1/2013 |
| CN | 105049350 A | 11/2015 |
| CN | 109257278 A | 1/2019 |
| EP | 2993821 A1 | 3/2016 |
| EP | 2993836 A1 | 3/2016 |

(Continued)

OTHER PUBLICATIONS

Pier Luigi Ventre et al.,"SDN Architecture and Southbound APIs for IPv6 Segment Routing Enabled Wide Area Networks", Oct. 16, 2018,total:15paegs.

(Continued)

*Primary Examiner* — Gbemileke J Onamuti

(57) ABSTRACT

This application provides a segment routing method and apparatus. The method includes: An ingress routing device receives a packet sent by a terminal device; and obtains a functional program corresponding to the packet of the terminal device. The functional program is used to indicate one or more sequential computing processing steps/instructions, service processing steps/instructions, or network processing steps/instructions, the functional program includes one or more sequentially placed function identifiers FID, and each FID is used to represent one computing processing step/instruction, service processing step/instruction, or network processing step/instruction.

20 Claims, 25 Drawing Sheets

(56) References Cited

FOREIGN PATENT DOCUMENTS

WO  2018137761 A1  8/2018
WO  2018152019 A1  8/2018

OTHER PUBLICATIONS

Francesco Paolucci et al., "Network Service Chaining Using Segment Routing in Multi-Layer Networks", Jun. 6, 2018, 11 pages.
ZahraaN Abdullah et al.,"Segment Routing in Software Defined Networks:A Survey", First Quarter 2019, total 23 pages.
Uma Chunduri et al., "Preferred Path Routing—A Next-Generation Routing Framework Beyond Segment Routing",2018 EEE, total:7pages.

The second and upper segments are greatly affected by a computing delay of a first hop S1

The third and upper segments are greatly affected by computing delays of S1 and C1

The fourth and upper segments are greatly affected by computing delays of S1, C1, and S2

...

Functional function program = fn (... (f3 (f2 (f1 (computing-related data))))...)

Functional function program = fn (... (f3 (f2 (f1 (computing-related data))))...)

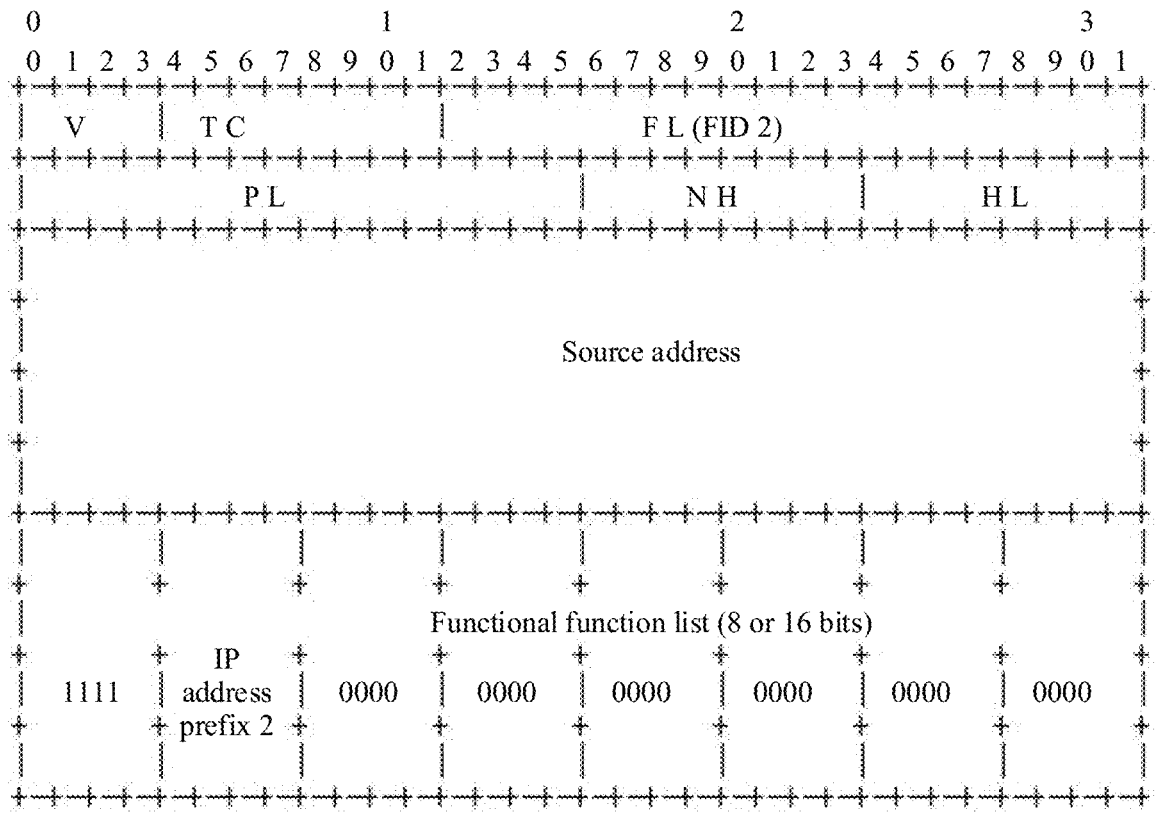

FIG. 9b

An egress routing device receives a packet from an ingress routing device or an intermediate routing device, where the packet carries a functional function program, the functional function program is used to indicate one or more sequential computing processing steps/instructions, service processing steps/instructions, or network processing steps/instructions, the functional function program includes one or more sequentially placed functional function identifiers FID, and each FID is used to represent one computing processing step/instruction, service processing step/instruction, or network processing step/instruction ⟵ S201

The egress routing device determines, based on a FIB or a RIB, an egress port corresponding to a first sequentially placed FID and/or an egress port corresponding to an IP address prefix corresponding to the FID ⟵ S202

FIG. 10

SEGMENT ROUTING METHOD AND APPARATUS

CROSS-REFERENCE TO RELATED APPLICATIONS

This application is a continuation of International Application No. PCT/CN2020/113260, filed on Sep. 3, 2020, which claims priority to Chinese Patent Application No. 201910834195.2, filed on Sep. 4, 2019. The disclosures of the aforementioned applications are hereby incorporated by reference in their entireties.

TECHNICAL FIELD

This application relates to the field of communications technologies, and in particular, to a segment routing method and apparatus.

BACKGROUND

Currently, with a trend of "ubiquitous connectivity and intelligence", more data will be processed at an edge side in the future. Carriers are eager to resolve a multi-cloud interconnection problem, for example, edge cloud computing or cloud computing. Segment routing (Segment Routing, SR) v6 is a next-generation IPv6 network routing technology. The SRv6 routes based on a source address and maintains a status only at a network edge. This makes the SRv6 ideal for ultra-large-scale software-defined networking (software-defined networking, SDN) deployments. The SRv6 has become a standard network transport technology that supports development of 5G, Internet of Things, multi-cloud service, and microservice. Therefore, the SRv6 can be applied to a multi-cloud interconnection field, for example, edge computing or cloud computing.

FIG. 1 is a schematic diagram of a service in which SRv6 is applied to a multi-cloud interconnection field. As shown in FIG. 1, it is assumed that the service may be divided into n sequential microservice processing steps SR: <S1, C1, S2, S3, D>. In this case, an SRv6 service processing path may be divided into n network/service segments. A segment 1 is responsible for submitting a packet to a site in which S1 is located for processing at S1; a segment 2 is responsible for sending the packet to a site in which C1 is located for processing at C1; . . . ; and a segment 5 is responsible for sending the packet to a site in which D is located for processing at D. The SRv6 is an "early binding (Early Binding)" technology. Early binding means that "name-address mapping" is determined before a routing phase. To be specific, a controller needs to bind a name of a to-be-processed service to an IPv6 address list corresponding to a sequence of segment lists in advance, and then delivers the IPv6 address list to an initial SRv6 router on an SRv6 service processing path.

However, when the SRv6 is applied to the multi-cloud interconnection field, the following two problems occur. First, in an edge computing or a cloud computing scenario, a computing delay is usually much greater than a network delay. As shown in FIG. 1, after a first segment arrives at S1 for computing processing, optimal locations for performing computing services may have changed. As a result, an actual optimal computing host/service IP address in the routing phase is inconsistent with a destination IP address allocated before the routing phase. IP address inconsistency may be caused by various reasons such as client movement, service/function movement, load balancing, or a fault. As a result, a service location of a computing host dynamically changes, and it is difficult for a management/control plane to dynamically update optimal computing host/service IPs of segments in real time.

SUMMARY

This application provides a segment routing method and apparatus, to resolve an address inconsistency problem caused by dynamic changes in a service location of a computing host.

According to a first aspect, an embodiment of this application provides a segment routing method, including:

An ingress routing device receives a packet sent by a terminal device.

The ingress routing device obtains a functional program corresponding to the packet of the terminal device. The functional program is used to indicate one or more sequential computing processing steps/instructions, service processing steps/instructions, or network processing steps/instructions, the functional program includes one or more sequentially placed function identifiers (FIDs), and each FID is used to represent one computing processing step/instruction, service processing step/instruction, or network processing step/instruction.

The ingress routing device determines, based on a forwarding information base FIB or a routing information base RIB, one of an IP address prefix, an egress routing device address, or an egress port corresponding to a sequentially placed first FID, and forwards the packet based on the determined one of the IP address prefix, the egress routing device address, or the egress port.

According to the segment routing method provided in the first aspect, after receiving the packet sent by the terminal device, the ingress routing device obtains the functional program corresponding to the packet of the terminal device. The functional program is used to indicate n sequential computing processing steps/instructions, service processing steps/instructions, or network processing steps/instructions, and the functional program includes the plurality of FIDs. The ingress routing device determines, based on the forwarding information base FIB or the routing information base RIB, the IP address prefix, the egress routing device address, or the egress port corresponding to the first FID, and forwards the packet based on the determined IP address prefix, egress routing device address, or egress port. Therefore, "name-address mapping" is delayed to a routing phase. A controller delivers only a FID list, instead of an IPv6 address list, that a user concerns to the ingress routing device. "name" in "name-address mapping" is a FID and "address" is an IPv6 address. The ingress routing device performs addressing or routing based on the FID to obtain a computing host/service IP address with a shortest actual delay or a strongest computing capability. It is not allocating a destination IP address before the routing phase. This can resolve address inconsistency caused by dynamic changes in a service location of a computing host.

In a possible design, the packet of the terminal device does not carry a FID, and that a functional program corresponding to the packet of the terminal device is obtained includes:

The ingress routing device obtains, from a controller/network management system, the functional program corresponding to the packet of the terminal device, and places the obtained functional program into the packet.

In a possible design, the packet of the terminal device carries a FID, and that a functional program corresponding to the packet of the terminal device is obtained includes:

The ingress routing device obtains the functional program from the packet of the terminal device. The functional program is obtained by the terminal device from a response packet sent by a domain name server DNS and placed into the packet, and the response packet is sent by the DNS based on a received request packet that carries a universal resource identifier URI, an application software name, or a service name.

In a possible design, the functional program is placed into an IPv6 extension header; or the functional program is placed into a destination address field of an IPv6 packet header or the destination address field in the IPv6 packet header and the IPv6 extension header.

Transmission efficiency can be improved by using a lightweight SRv6 encapsulation method used in this implementation.

In a possible design, computing-related data used by the functional program is placed into a payload field or the IPv6 extension header, or computing-related data used by the functional program is placed into a payload field or the IPv6 extension header.

In a possible design, that the ingress routing device determines, based on a forwarding information base FIB or a routing information base RIB, one of an IP address prefix, an egress routing device address, or an egress port corresponding to a sequentially placed first FID, and forwards the packet based on the determined one of the IP address prefix, the egress routing device address, or the egress port includes:

The ingress routing device searches the FIB or the RIB for an IP address prefix corresponding to the FID; and
  adds the IP address prefix to the FID to obtain an IP address, and forwards the packet by using the IP address as a destination IP address, replaces the FID with the IP address prefix corresponding to the FID, and forwards the packet based on the IP address prefix, or stores the FID in another field other than a destination address of an IP packet header, replaces the FID with the IP address prefix corresponding to the FID, and forwards the packet based on the IP address prefix;
  the ingress routing device searches the FIB or the RIB for an egress routing device address corresponding to the FID, adds tunnel encapsulation to the packet by using the egress routing device address as a tunnel destination address, and the ingress routing device sends the packet to which the tunnel encapsulation is added to an egress routing device; or
  the ingress routing device searches the FIB or the RIB for an egress port corresponding to the FID, and outputs the packet based on the egress port.

In a possible design, before the forwarding the packet by using the IP address as a destination IP address, or before the forwarding the packet based on the IP address prefix, the method further includes:

The ingress routing device performs a hash operation based on a multi-tuple to obtain a hash value, and places the hash value into another field of the IPv6 extension header or another field, other than the destination address, of the IPv6 packet header; or
  the ingress routing device obtains a hash value carried in the packet, and searches, based on the hash value, an output IP address prefix, an egress routing device address, or an egress port that is of a hash table stored by the ingress routing device and that is corresponding to the hash value.

In a possible design, the FIB includes: a correspondence between a FID, and an output IP address prefix and an egress port, a correspondence between a FID, and an egress routing device address and an egress port, a correspondence between a FID and an egress port, or a correspondence between a FID and a hash table-related parameter, where the hash table-related parameter includes a start location and/or a total quantity of entries in a hash table.

The RIB includes: a correspondence between a FID, and a computing metric value, an output IP address prefix, and an egress port, a correspondence between a FID, and a computing metric value, an egress routing device address, and an egress port, a correspondence between a FID, and a computing metric value and an egress port, or a correspondence between a FID and a hash table-related parameter, where the hash table-related parameter includes a start location and/or a total quantity of entries in a hash table.

In a possible design, the ingress routing device obtains, from a computing container, a FID or an IP address prefix of a functional function instance supported by the computing container, or an egress routing device address, and a computing capacity or a computing status of the computing container, where the computing container is a server, a computing site, a virtual machine, or a container.

The ingress routing device generates a corresponding computing metric value based on the computing capacity or the computing status of the computing container.

The ingress routing device generates the RIB based on the computing metric value, and the FID or the IP address prefix of the functional function instance supported by the computing container, or the egress routing device address.

The ingress routing device generates the FIB based on the RIB.

According to a second aspect, an embodiment of this application provides a segment routing method, including:

An egress routing device receives a packet from an ingress routing device or an intermediate routing device. The packet carries a functional program, the functional program is used to indicate one or more sequential computing processing steps/instructions, service processing steps/instructions, or network processing steps/instructions, the functional program includes one or more sequentially placed function identifiers FIDs, and each FID is used to represent one computing processing step/instruction, service processing step/instruction, or network processing step/instruction.

The egress routing device determines, based on a forwarding information base FIB or a routing information base RIB, an egress port corresponding to a first sequentially placed FID and/or an egress port corresponding to an IP address prefix corresponding to the FID.

The egress routing device outputs the packet to a computing container through the egress port, to enable the computing container to perform functional function processing corresponding to the FID, where the computing container is a server, a computing site, a virtual machine, or a container.

According to the segment routing method provided in the second aspect, the egress routing device receives the packet from the ingress routing device or the intermediate routing device. The packet carries the functional program, and the functional program is used to indicate m sequential computing processing steps/instructions, service processing steps/instructions, or network processing steps/instructions, and the functional program includes the plurality of FIDs.

The egress routing device determines, based on the forwarding information base FIB or the routing information base RIB, the egress port corresponding to the first FID and/or the egress port corresponding to the IP address prefix corresponding to the FID. The egress routing device outputs the packet to the computing container through the egress port, to enable the computing container to perform functional function processing corresponding to the FID, where the computing container is the server, the computing site, the virtual machine, or the container. Therefore, "name-address mapping" is delayed to a routing phase. "name" in "name-address mapping" is a FID and "address" is an IPv6 address. The egress routing device performs addressing or routing based on the FID to obtain a computing host/service IP address with a shortest actual delay or a strongest computing capability. It is not allocating a destination IP address before the routing phase. This can resolve address inconsistency caused by dynamic changes in a service location of a computing host.

In a possible design, the method further includes:

The egress routing device shifts the plurality of FIDs included in the functional program, deletes a processed FID, and pads 0 after a last bit is shifted; or the egress routing device shifts the plurality of FIDs included in the functional program, deletes a processed FID, pads 0 after a last bit is shifted, and deletes an IPv6 extension header in which the functional program is located after functional function processing corresponding to all the FIDs is completed.

In a possible design, if the packet carries a hash value, the method further includes:

The egress routing device obtains the hash value carried in the packet, and searches, based on the hash value, an IP address prefix and/or an egress port that are/is of a hash table stored by the egress routing device and that are/is corresponding to the hash value.

In a possible design, the FIB includes: a correspondence between a FID, and an input IP address prefix and an egress port, a correspondence between a FID and an egress port, or a correspondence between a FID and a hash table-related parameter, where the hash table-related parameter includes a start location and/or a total quantity of entries in a hash table.

The RIB includes: a correspondence between a FID, and a computing metric value, an input IP address prefix, and an egress port, a correspondence between a FID, and a computing metric value and an egress port, or a correspondence between a FID, and a computing metric value and a hash table-related parameter, where the hash table-related parameter includes a start location and/or a total quantity of entries in a hash table.

In a possible design, the functional program is placed into the IPv6 extension header; or the functional program is placed into a destination address field of an IPv6 packet header or the destination address field in the IPv6 packet header and the IPv6 extension header.

Transmission efficiency can be improved by using a lightweight SRv6 encapsulation method used in this implementation.

In a possible design, computing-related data used by the functional program is placed into a payload field or the IPv6 extension header, or computing-related data used by the functional program is placed into a payload field or the IPv6 extension header.

In a possible design, the egress routing device obtains, from the computing container, a FID or an IP address prefix of a functional function instance supported by the computing container, or an egress routing device address, and a computing capacity or a computing status of the computing container.

The egress routing device generates a corresponding computing metric value based on the computing capacity or the computing status of the computing container.

The egress routing device generates the RIB based on the computing metric value, and the FID or the IP address prefix of the functional function instance supported by the computing container, or the egress routing device address.

The egress routing device generates the FIB based on the RIB.

According to a third aspect, an embodiment of this application provides a segment routing apparatus, including:

a receiving module, configured to receive a packet sent by a terminal device;

an obtaining module, configured to obtain a functional program corresponding to the packet of the terminal device, where the functional program is used to indicate one or more sequential computing processing steps/instructions, service processing steps/instructions, or network processing steps/instructions, the functional program includes one or more sequentially placed function identifiers FIDs, and each FID is used to represent one computing processing step/instruction, service processing step/instruction, or network processing step/instruction; and a forwarding processing module, configured to: determine, based on a forwarding information base FIB or a routing information base RIB, one of an IP address prefix, an egress routing device address, or an egress port corresponding to a sequentially placed first FID, and forward the packet based on the determined one of the IP address prefix, the egress routing device address, or the egress port.

In a possible design, the packet of the terminal device does not carry a FID, and the obtaining module is configured to:

obtain, from a controller/network management system, the functional program corresponding to the packet of the terminal device, and place the obtained functional program into the packet.

In a possible design, the packet of the terminal device carries a FID, and the obtaining module is configured to:

obtain, by the ingress routing device, the functional program from the packet of the terminal device. The functional program is obtained by the terminal device from a response packet sent by a domain name server DNS and placed into the packet, and the response packet is sent by the DNS based on a received request packet that carries a universal resource identifier URI, an application software name, or a service name.

In a possible design, the functional program is placed into an IPv6 extension header; or the functional program is placed into a destination address field of an IPv6 packet header or the destination address field in the IPv6 packet header and the IPv6 extension header.

In a possible design, computing-related data used by the functional program is placed into a payload field or the IPv6 extension header, or computing-related data used by the functional program is placed into a payload field or the IPv6 extension header.

In a possible design, the forwarding processing module is configured to:
search the FIB or the RIB for an IP address prefix corresponding to the FID; and
add the IP address prefix to the FID to obtain an IP address, and forward the packet by using the IP address as a destination IP address, replace the FID with the IP address prefix corresponding to the FID, and forward the packet based on the IP address prefix, or store the FID in another field other than a destination address of an IP packet header, replace the FID with the IP address prefix corresponding to the FID, and forward the packet based on the IP address prefix;
search the FIB or the RIB for an egress routing device address corresponding to the FID, add tunnel encapsulation to the packet by using the egress routing device address as a tunnel destination address, and send, by the ingress routing device, the packet to which the tunnel encapsulation is added to an egress routing device; or
search the FIB or the RIB for an egress port corresponding to the FID, and output the packet based on the egress port.

In a possible design, the FIB includes: a correspondence between a FID, and an output IP address prefix and an egress port, a correspondence between a FID, and an egress routing device address and an egress port, or a correspondence between a FID and an egress port.

The RIB includes: a correspondence between a FID, and a computing metric value, an output IP address prefix, and an egress port, a correspondence between a FID, and a computing metric value, an egress routing device address, and an egress port, or a correspondence between a FID, and a computing metric value and an egress port.

For beneficial effects of the segment routing apparatus according to the third aspect and the possible designs of the third aspect, refer to beneficial effects brought by the first aspect and the possible implementations of the first aspect. Details are not described herein again.

According to a fourth aspect, an embodiment of this application provides a segment routing apparatus, including:
a receiving module, configured to receive a packet from an ingress routing device or an intermediate routing device, where the packet carries a functional program, the functional program is used to indicate one or more sequential computing processing steps/instructions, service processing steps/instructions, or network processing steps/instructions, the functional program includes one or more sequentially placed function identifiers FIDs, and each FID is used to represent one computing processing step/instruction, service processing step/instruction, or network processing step/instruction;
a determining module, configured to determine, based on a forwarding information base FIB or a routing information base RIB, an egress port corresponding to a first sequentially placed FID and/or an egress port corresponding to an IP address prefix corresponding to the FID; and
an output module, configured to output the packet to a computing container through the egress port, to enable the computing container to perform functional function processing corresponding to the FID, where the computing container is a server, a computing site, a virtual machine, or a container.

In a possible design, the apparatus further includes:
a processing module, configured to: shift the plurality of FIDs included in the functional program, delete a processed FID, and pad 0 after a last bit is shifted; or
shift the plurality of FIDs included in the functional program, delete a processed FID, pad 0 after a last bit is shifted, and delete an IPv6 extension header in which the functional program is located after functional function processing corresponding to all the FIDs is completed.

In a possible design, if the packet carries a hash value, the apparatus further includes:
an obtaining module, configured to: obtain the hash value carried in the packet, and search, based on the hash value, an IP address prefix and/or an egress port that are/is of a hash table stored by an egress routing device and that are/is corresponding to the hash value.

In a possible design, the FIB includes: a correspondence between a FID, and an input IP address prefix and an egress port, a correspondence between a FID and an egress port, or a correspondence between a FID and a hash table-related parameter, where the hash table-related parameter includes a start location and/or a total quantity of entries in a hash table.

The RIB includes: a correspondence between a FID, and a computing metric value, an input IP address prefix, and an egress port, a correspondence between a FID, and a computing metric value and an egress port, or a correspondence between a FID, and a computing metric value and a hash table-related parameter, where the hash table-related parameter includes a start location and/or a total quantity of entries in a hash table.

In a possible design, the functional program is placed into the IPv6 extension header; or
the functional program is placed into a destination address field of an IPv6 packet header or the destination address field in the IPv6 packet header and the IPv6 extension header.

In a possible design, computing-related data used by the functional program is placed into a payload field or the IPv6 extension header, or computing-related data used by the functional program is placed into a payload field or the IPv6 extension header.

In a possible design, the apparatus further includes:
a generation module, configured to: obtain, from a virtual router running in the computing container, a FID or an IP address prefix of a functional function instance supported by the computing container, or an egress routing device address, and a computing capacity or a computing status of the computing container;
generate a corresponding computing metric value based on the computing capacity or the computing status of the computing container;
generate the RIB based on the computing metric value, and the FID or the IP address prefix of the functional function instance supported by the computing container, or the egress routing device address; and
generate the FIB based on the RIB.

For beneficial effects of the segment routing apparatus according to the fourth aspect and the possible designs of the fourth aspect, refer to beneficial effects brought by the second aspect and the possible implementations of the second aspect. Details are not described herein again.

According to a fifth aspect, an embodiment of this application provides an apparatus, including:
a processor; and
a memory, configured to store executable instructions of the processor.

The processor is configured to perform, by executing the executable instructions, the segment routing method according to any one of the first aspect and the possible designs of the first aspect or any one of the second aspect and the possible designs of the second aspect.

In a possible design, the foregoing apparatus may be a routing device or a chip.

According to a sixth aspect, this application provides a computer-readable storage medium. The computer-readable storage medium stores instructions. When the instructions are run on a computer, the computer is enabled to perform the methods according to the foregoing aspects.

According to a seventh aspect, this application provides a computer program product including instructions. When the computer program product runs on a computer, the computer is enabled to perform the methods according to the foregoing aspects.

BRIEF DESCRIPTION OF DRAWINGS

FIG. 9b is a schematic diagram of an operation on a functional function field;

FIG. 10 is a flowchart of an embodiment of a segment routing method according to this application;

DESCRIPTION OF EMBODIMENTS

In this embodiment of this application, words such as "example" or "for example" are used to represent examples, instances, or description. Any embodiment or solution described as "example" or "for example" in embodiments of this application is not to be construed as being more preferred or advantageous than other embodiments or solutions. Exactly, use of the word such as "example" or "for example" is intended to present a related concept in a specific manner.

In this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally represents an "or" relationship between the associated objects.

First, the following describes some terms in embodiments of this application, to facilitate understanding of a person skilled in the art.

1. Functional program (Functional Program): A concept of a "functional program" is introduced in this application to replace a series of independent computations, services, or application requests. An in-band (In-band) functional program is used to simplify and offload a session state of a client/server and an in-band state (In-band state) of a client context transferred in a network, to keep a terminal/edge as simple as possible or even stateless. In addition, a computing processing delay is reduced.

Figure 1:
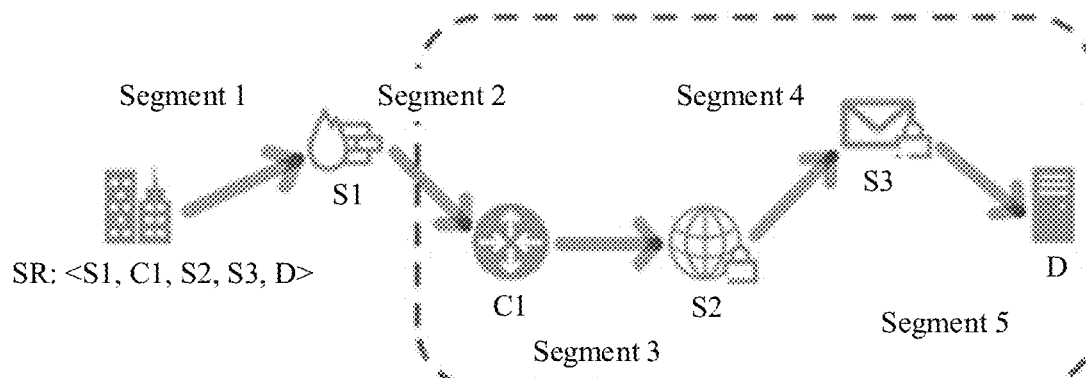
FIG. 1 is a schematic diagram of a service in which SRv6 is applied to a multi-cloud interconnection field.
Figure 2:
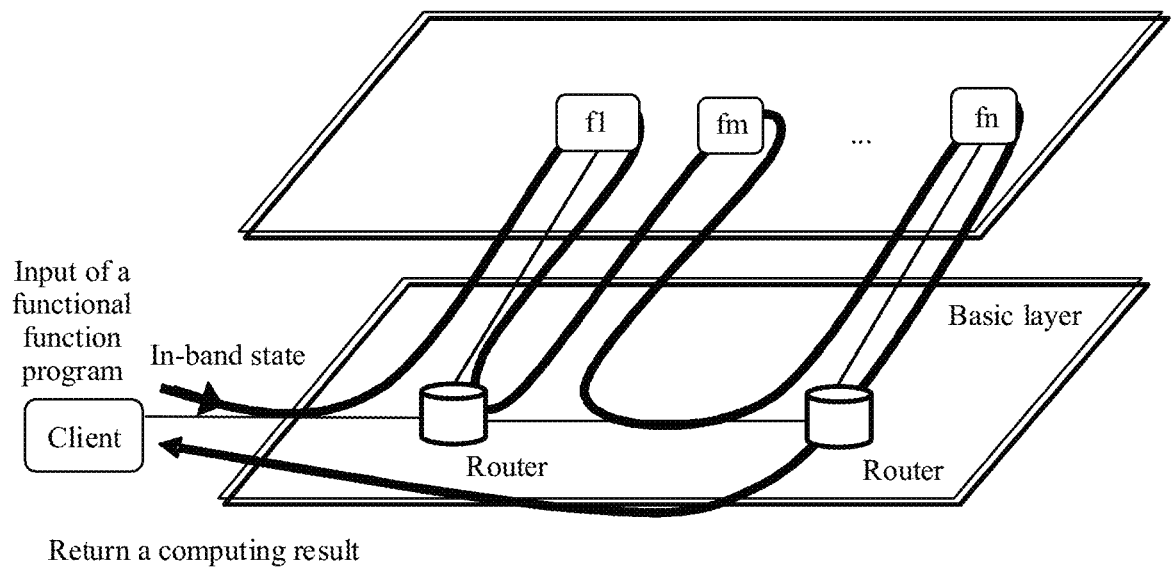
FIG. 2 is a schematic diagram of simplifying and offloading, by using a functional program, a session state of a client/server and an in-band state of a client context transferred in a network according to this application.

Because a result (IP packet) output after a previous-hop router in the network performs routing is always used as an input to a next-hop router for next-hop routing. A service, computation, a service, or an application can be expressed as a "functional program". In other words, the functional program=fn ( . . . (f3 (f2 (f1 (computing-related data)))) . . . ). Here, fk (x, . . . , y) represents a functional function fk. Input parameters of the functional function fk are x, . . . , y, and an output value is fk(x, . . . , y). Computing-related data is input parameters of f1, such as images, video, audio, files, and values. Therefore, in this application, the functional program is used as an input request packet of a special network, to replace an existing series of independent request packets of computation, service, or application requests. FIG. 2 is a schematic diagram of simplifying and offloading, by using a functional program, a session state of a client/server and an in-band state of a client context transferred in a network according to this application. As shown in FIG. 2, a router of the functional program is at a lower layer (represented by a rhombus quadrilateral in FIG. 2), for example, may be referred to as a basic layer (Basic layer). A software-based computing program, a functional program, service software, a microservice, or the like is deployed at an upper layer (represented by a rhombus quadrilateral in FIG. 2), where f, namely, f1, . . . , fm, . . . , and fn in FIG. 2, represents the deployed software-based computing program, functional program, service software, or microservice. f may alternatively use a hardware accelerator to improve processing performance.

A terminal device in this embodiment of this application may be a wireless terminal. The wireless terminal may be a device that provides voice and/or other service data connectivity for a user, a handheld device with a wireless connection function, or another processing device connected to a wireless modem. A wireless terminal may communicate with one or more core networks by using a radio access network (RAN), and the wireless terminal may be a mobile terminal such as a mobile phone (or referred to as a "cellular" phone) and a computer having a mobile terminal, for example, may be portable, pocket-sized, handheld, computer built-in, or vehicle-mounted mobile devices that exchange language and/or data with the radio access network. For example, the wireless terminal may be a device such as a personal communications service (Personal Communications Service, PCS) phone, a cordless telephone set, a session initiation protocol (Session Initiation Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile (Mobile) terminal, a remote station (Remote Station), a remote terminal (Remote Terminal), an access terminal (Access Terminal), a user terminal (User Terminal), a user agent (User Agent), a user device (User Device or User Equipment). This is not limited herein.

The terminal device in this embodiment of this application may alternatively be a client.

In a related technology, when SRv6 is applied to a multi-cloud interconnection field, in an edge computing or cloud computing scenario, "name-address mapping" is determined in advance before a routing phase. However, in an actual routing process, a computing delay is usually far greater than a network delay. Dynamic changes in a service location of a computing host lead to that an actual optimal computing host/service IP in the routing phase is inconsistent with a destination IP address allocated before the routing phase. To resolve this problem, this application provides a segment routing method and apparatus, uses a delayed binding mechanism, postpones "name-address mapping" to the routing phase. Specifically, for the SRv6, a controller delivers only a functional function identifier list, instead of an IPv6 address list, to an ingress router (namely, a first SRv6 router). "name" in "name-address mapping" is a functional function identifier (FID), and "address" is an IPv6 address. The router obtains, in the routing phase, a computing host/service IP address, instead of a destination IP address allocated before the routing phase, with a shortest actual delay or a strongest computing capability through the routing mechanism. This can resolve address inconsistency caused by the dynamic changes in the service location of the computing host.

Second, in the related technology, after receiving a data packet, an application-specific integrated circuit (application-specific integrated circuit, ASIC)/network process unit (network process unit, NPU) of an SRv6 router stores the data packet in an external memory. The ASIC/NPU reads header content with a fixed length (usually 64 to 128 bytes), searches a forwarding table in a local or external memory of a chip, and forwards the data packet. The SRv6 packet header is excessively long and cannot be read in one processing period. Therefore, the SRv6 packet header needs to be read within two processing periods. As a result, a throughput decreases by half, and transmission efficiency is low. To resolve this problem, the transmission efficiency can be improved by using a lightweight SRv6 encapsulation method in this application.

The following describes in detail a specific implementation process of the segment routing method and apparatus provided in this application with reference to the accompanying drawings.

Figure 3:
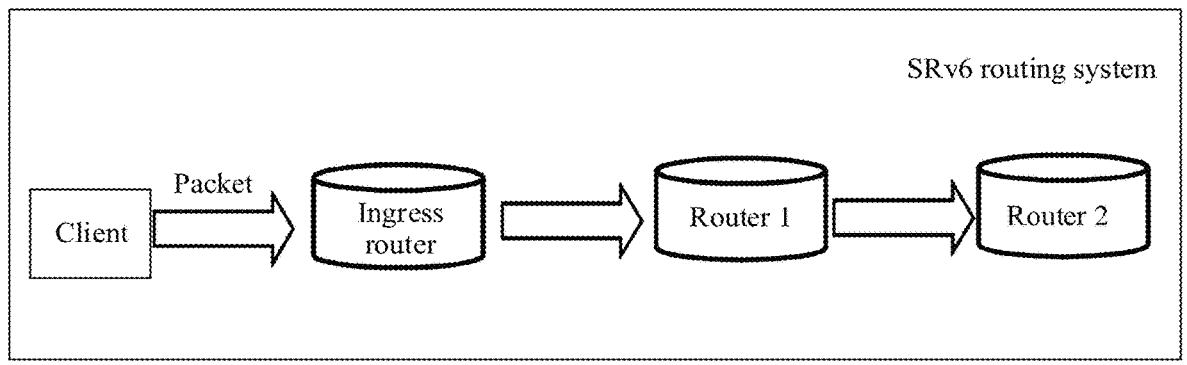
FIG. 3 is a schematic diagram of a structure of an SRv6 routing system according to this application.

This application may be applied to an improved lightweight SRv6 routing system. FIG. 3 is a schematic diagram of a structure of an SRv6 routing system according to this application. As shown in FIG. 3, main network elements in this application include an ingress router, an egress router, and an intermediate router. A router 1 or a router 2 in FIG. 3 may be the intermediate router or the egress router. Each router in the system maintains a routing information base (routing information base, RIB) and a forwarding information base (forwarding information base, FIB). For the ingress router, the FIB includes: a correspondence between a FID, and an output IP address prefix and an egress port, or a correspondence between a FID, and an egress router address and an egress port. The RIB includes: a correspondence between a FID, and a computing metric value, an output IP address prefix, and an egress port, or a correspondence between a FID, and a computing metric value, an egress router device address, and an egress port. For the egress router, the FIB includes: a correspondence between a FID, and an input IP address prefix and an egress port, a correspondence between a FID and an egress port, or a correspondence between a FID and a hash table-related parameter. The RIB includes: a correspondence between a FID, and a computing metric value, an input IP address prefix, and an egress port, a correspondence between a FID, and a computing metric value and an egress port, or a correspondence between a FID and a hash table-related parameter. Optionally, the ingress router and the egress router further store hash tables. An ingress router hash table includes an IP address prefix, an egress router address, or an egress port. An egress router hash table includes an IP address prefix and/or an egress port. When the hash tables are stored, the FIB and the RIB further include hash table-related parameters (such as start locations or total quantities of entries in the hash tables).

For the intermediate router, route aggregation can be performed on route entries to greatly reduce a quantity of route entries. In this way, the intermediate router may be unaware of the FID. In addition, data plane hardware of a conventional router can be used, and only control plane software needs to be upgraded. A RIB of the intermediate router includes an IP address prefix, an egress port, and the like; or an IP address prefix, an egress router address, and the like. A FIB of the intermediate router includes an IP address prefix, an egress port, and the like. Alternatively, the FIB includes an IP address prefix, a corresponding egress router address, and the like.

FIG. 3 uses an example in which an SRv6 path is divided into two segments. A destination address of a first segment is an egress router, for example, the router 1. A destination address of a second segment is an egress router, for example, the router 2. After a packet of a client or user equipment reaches the ingress router, the ingress router performs addressing or routing based on a FID, and a FIB or a RIB that are carried in the packet. After the packet reaches the egress router, the egress router performs addressing or routing based on the FID, and the FIB or the RIB that are carried in the packet. In this application, ingress and egress are concepts relative to the client/user equipment. A first device close to the client is referred to as an ingress routing device, and a last device is referred to as an egress routing device. The following describes an example in which the ingress routing device is an ingress router, and the egress routing device is an egress router in this application.

Figure 4:
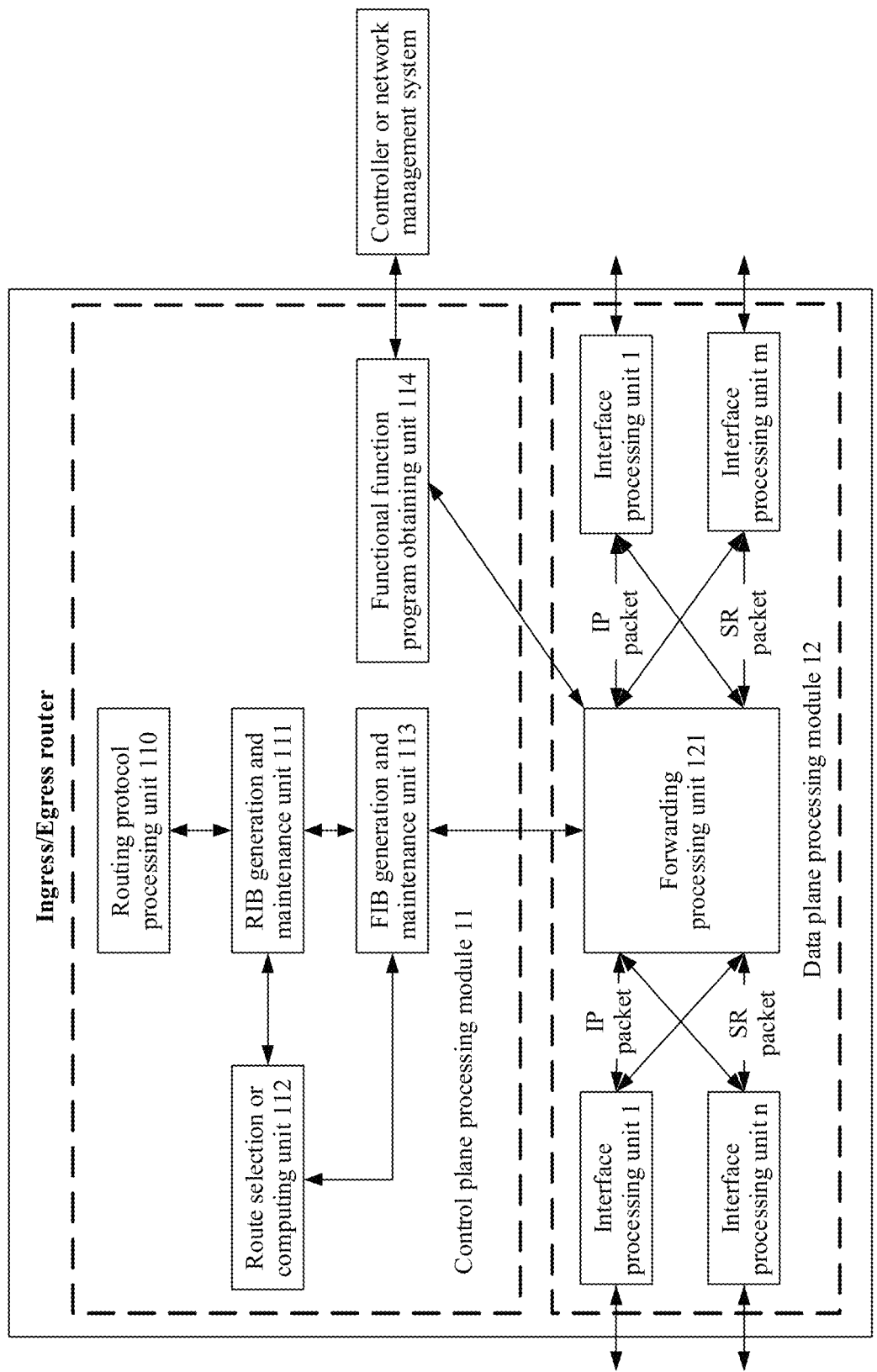
FIG. 4 is a schematic diagram of a structure of an ingress/egress router according to this application.

FIG. 4 is a schematic diagram of a structure of an ingress/egress router according to this application. As shown in FIG. 4, the ingress/egress router includes a control plane processing module 11 and a data plane processing module 12. The control plane processing module 11 includes a routing protocol processing unit 110, a RIB generation and maintenance unit 111, a route selection or computing unit 112, a FIB generation and maintenance unit 113, and a functional program obtaining unit 114. The data plane processing module 12 includes a forwarding processing unit 121 and a plurality of interface processing units. It should be noted that the control plane processing module 11 of the egress router does not include the functional program obtaining unit 114.

The routing protocol processing unit 110 is configured to: obtain, from a virtual router running in a computing container, a FID or an IP address prefix of a functional function instance supported by the computing container, or an egress router device address, and a computing capacity or a computing status of the computing container; and advertise the obtained information between routers.

The RIB generation and maintenance unit 111 is configured to generate a RIB based on a computing metric value, and the FID or the IP address prefix of the functional function instance supported by the computing container, or the egress router address.

The route selection or computing unit 112 is configured to find, based on the FIB, an IP address prefix, an egress router address, or an egress port corresponding to the FID, or select or compute a route based on a computing metric value of the RIB to obtain the IP address prefix, the egress router address, or the egress port corresponding to the FID. In other words, load balancing is implemented between sites.

The FIB generation and maintenance unit 113 is configured to generate a corresponding FIB based on a processing result, namely, the RIB, of the route selection or computing unit.

The functional program obtaining unit 114 is configured to: obtain, from a controller/network management system, a functional program corresponding to a packet of a client, or obtain a functional program from the packet of the client.

For the ingress router, the forwarding processing unit 121 is configured to directly perform IP forwarding when the packet carries a conventional destination IP address. Alternatively, after obtaining the functional program corresponding to the packet, the functional program obtaining unit 114 adds an IPv6 extension header; places the obtained functional program into the IPv6 extension header, a destination address field of an IPv6 packet header, or the destination address field in the IPv6 packet header and the IPv6 extension header; determines, based on the forwarding information base FIB or the routing information base RIB, an IP address prefix, an egress routing device address, or an egress port corresponding to a first FID; and forwards the packet based on the determined IP address prefix, egress routing device address, or egress port.

For the egress router, the forwarding processing unit 121 is configured to: determine, based on the FIB or the RIB, the egress port corresponding to the first FID and/or an egress port corresponding to the IP address prefix corresponding to the FID, and output the packet to the computing container through the egress port, to enable the computing container to perform functional function processing corresponding to the FID. The computing container is a server, a computing site, a virtual machine, or a container. Specifically, the FIB or the RIB is searched based on the first FID and/or the IP address prefix corresponding to the FID to obtain the egress port or a virtual egress port, and the packet is forwarded through the egress port or the virtual egress port. The forwarding processing unit 121 is further configured to: shift a plurality of FIDs included in the functional program, delete a processed FID, and pad 0 after a last bit is shifted. Alternatively, the forwarding processing unit 121 is further configured to: shift a plurality of FIDs included in the functional program, delete a processed FID, pad 0 after a last bit is shifted, and delete the IPv6 extension header in which the functional program is located after functional function processing corresponding to all the FIDs is completed.

The interface processing unit 122 is configured to perform input or output processing of an interface.

Figure 5:
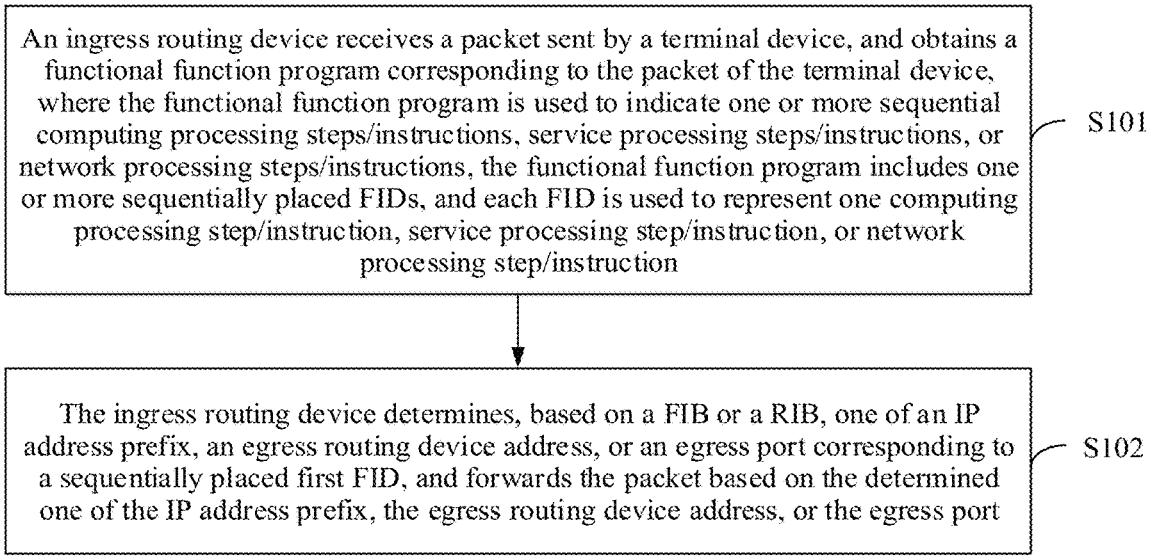
FIG. 5 is a flowchart of an embodiment of a segment routing method according to this application.

FIG. 5 is a flowchart of an embodiment of a segment routing method according to this application. As shown in FIG. 5, this embodiment may be performed by an ingress routing device, for example, an ingress router, and the method in this embodiment may include the following steps.

S101: The ingress routing device receives a packet sent by a terminal device, and obtains a functional program corresponding to the packet of the terminal device, where the functional program is used to indicate one or more sequential computing processing steps/instructions, service processing steps/instructions, or network processing steps/instructions, the functional program includes one or more sequentially placed FIDs, and each FID is used to represent one computing processing step/instruction, service processing step/instruction, or network processing step/instruction.

Specifically, the plurality of sequentially placed FIDs are, for example, a FID 1, a FID 2, . . . , and a FID n; or a FID n, a FID n-1, . . . , a FID 2, and a FID 1.

Specifically, in a possible implementation, the packet of the terminal device does not carry the FID, and that the ingress routing device obtains a functional program corresponding to the packet of the terminal device may be specifically: The ingress routing device obtains, from a controller/network management system, the functional program corresponding to the packet of the terminal device, and places the obtained functional program into the packet. The packet is a received packet sent by the terminal device. Specifically, the obtained functional program may be placed into a functional function list field of the packet.

In another possible implementation, the packet of the terminal device carries the FID, and that the ingress routing device obtains a functional program corresponding to the packet of the terminal device may be specifically: The ingress routing device obtains the functional program from the packet of the terminal device. The functional program is obtained by the terminal device from a response packet sent by a domain name server (Domain name Server, DNS) and placed into the packet, and the response packet is sent by the DNS based on a received request packet that carries a universal resource identifier (Uniform Resource Identifier, URI), an application software name, or a service name. Specifically, if the packet of the terminal device carries the FID, the terminal device obtains the functional program. Specifically, the terminal device sends the request packet that carries the URI, the application software name, or the service name to the DNS; obtains the corresponding functional program from the response packet of the DNS; and places the functional program into the IPv6 packet, which may be specifically placing the functional program into a functional function list field in the IPv6 packet, to add the functional program to a network or a computing container. That the ingress routing device obtains the functional program from the packet of the terminal device may be specifically: The ingress router adds an IPv6 extension header, and copies the functional program from a functional function list field of an IP packet header to a functional function list field of an IPv6 extension header.

Figure 6:
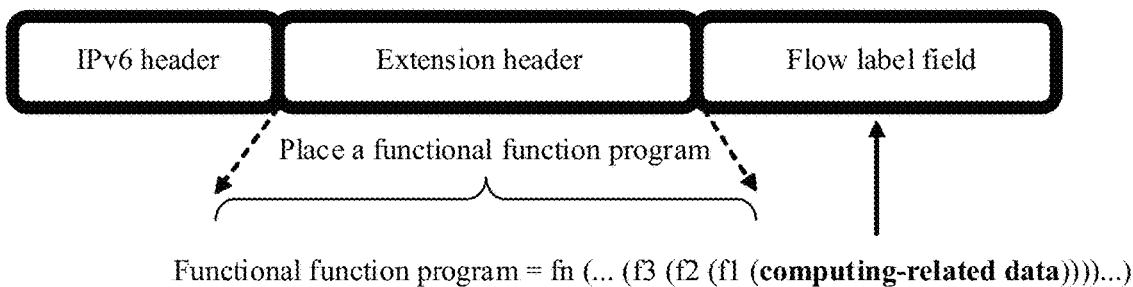
FIG. 6 is a schematic diagram of an IPv6 packet header according to this application.

In this embodiment, the ingress routing device places the obtained functional program into the IPv6 packet, or the terminal device places the obtained functional program into the IPv6 packet. Optionally, in a possible implementation, FIG. 6 is a schematic diagram of an IPv6 packet header according to this application. As shown in FIG. 6, a functional program may be placed into an IPv6 extension header. Optionally, computing-related data used by the functional program is placed into a payload field or the IPv6 extension header. The transmission efficiency can be improved by using a lightweight SRv6 encapsulation method in this application.

Figure 7:
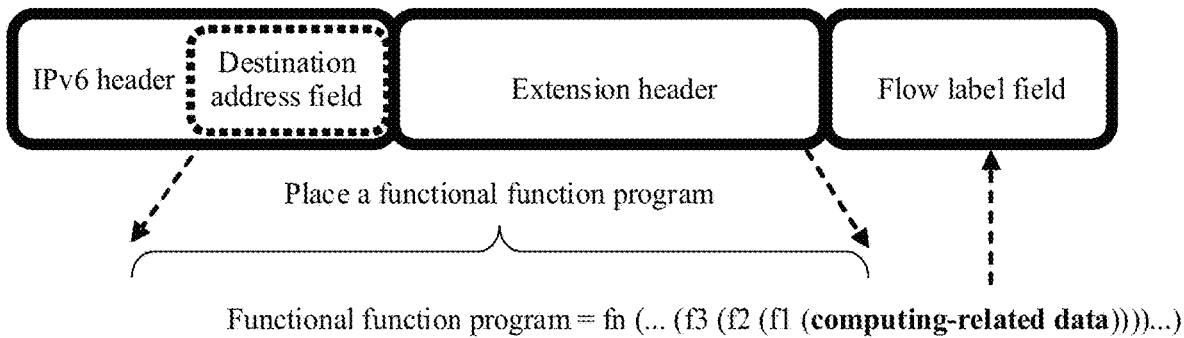
FIG. 7 is a schematic diagram of another IPv6 packet header according to this application.

In another possible implementation, FIG. 7 is a schematic diagram of another IPv6 packet header according to this application. As shown in FIG. 7, a functional program may be placed into a destination address field of an IPv6 packet header, or the destination address field in the IPv6 packet header and an IPv6 extension header. Optionally, computing-related data used by the functional program is placed into a payload field or the IPv6 extension header.

Figure 8A:
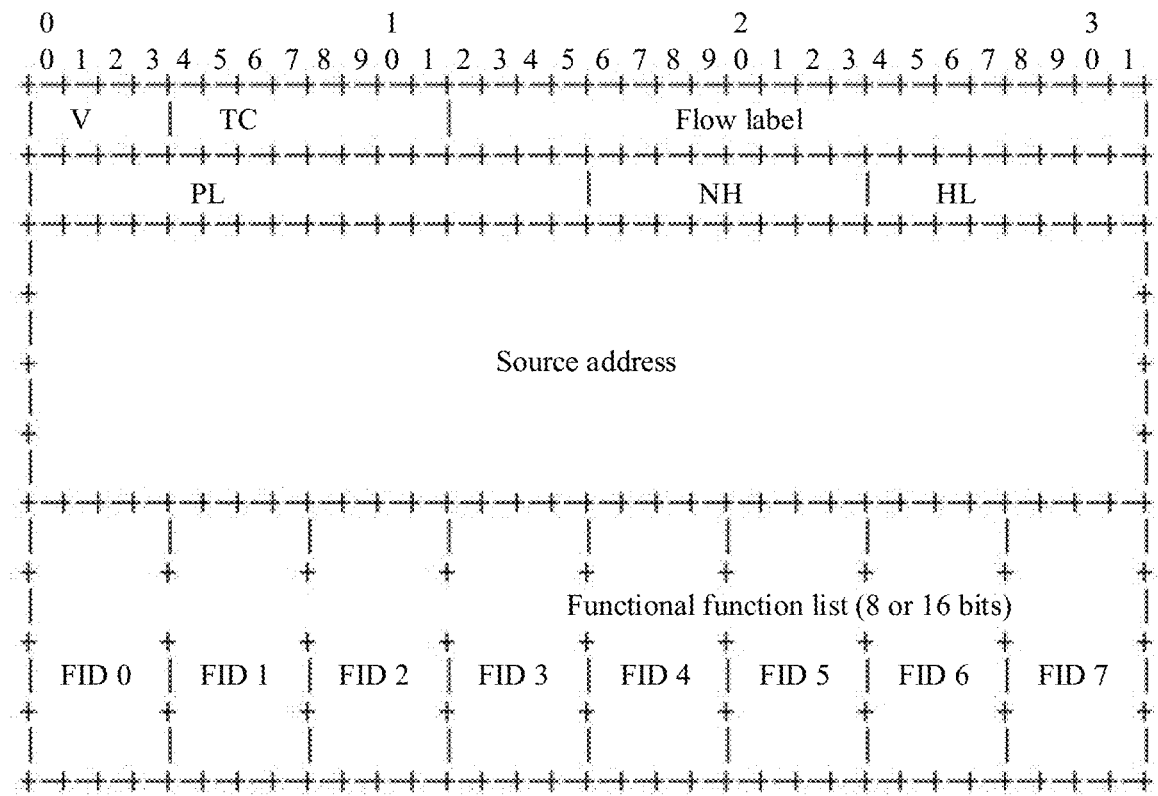
FIG. 8a is a schematic diagram of a format of an IPv6 packet header according to this application.

Specifically, FIG. 8*a* is a schematic diagram of a format of an IPv6 packet header according to this application. As shown in FIG. 8*a*, a destination address (Destination Address) field of the original IPv6 packet header is changed to a functional function list field for carrying a functional program that indicates n sequential computing processing steps/instructions, service processing steps/instructions, or network processing steps/instructions. Each functional function has a 4-bit, 8-bit, or 16-bit FID that represents one computing, service, or network processing step/instruction.

A version (version) field may be set to a special value (for example, the value is 7) to indicate that the packet header supports the functional program. Alternatively, a FID 0 is set to a special value (for example, the value is all is per bit), and is used as a start character of the functional program. Because the functional program needs to be distinguished from another conventional IP address, a first FID, namely, a FID 1, . . . , and a FID 7, following the start character actually represents a computing, service, or network processing step/instruction. If the FID is set to a special value (for example, the value is all 0s per bit), it indicates an end of the functional program.

Figure 8B:
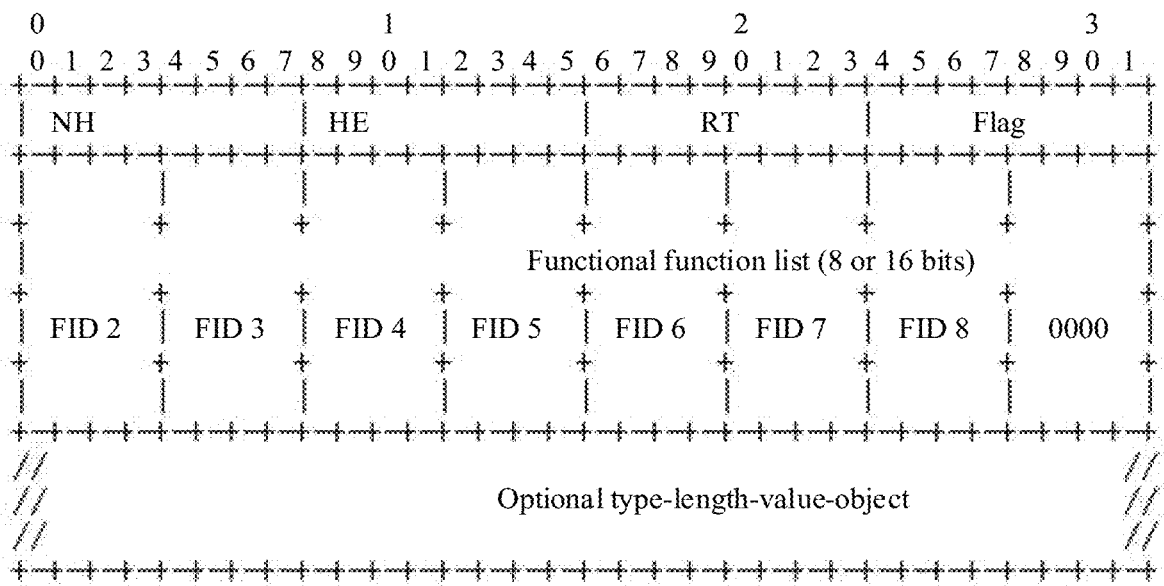
FIG. 8b is a schematic diagram of a format of an IPv6 packet header according to this application.

FIG. 8*b* is a schematic diagram of a format of an IPv6 packet header according to this application. As shown in FIG. 8*b*, a next header of the IPv6 packet header indicates a protocol type of an IPv6 extension header. Hdr Ext Len indicates a length of the IPv6 extension header, and a functional function list field is used to carry a functional program that indicates n sequential computing, service, or network processing steps/instructions. Each functional function has a 4-bit, 8-bit, or 16-bit FID that represents one computing, service, or network processing step/instruction. A routing type field may be set to a special value (for example, the value is 7) to indicate that the packet header supports the functional program. The functional program usually does not need to set a start character herein. Because the functional program does not need to be distinguished from another conventional IP address as the functional program shown in FIG. 8*a*, if the FID is set to a special value (for example, the value is all 0s per bit), it indicates an end of the functional program. Flag may be selected to store an SR header (SR header, SRH) pointer (a FID pointer for indicating a valid FID), or another state.

Figure 8C:
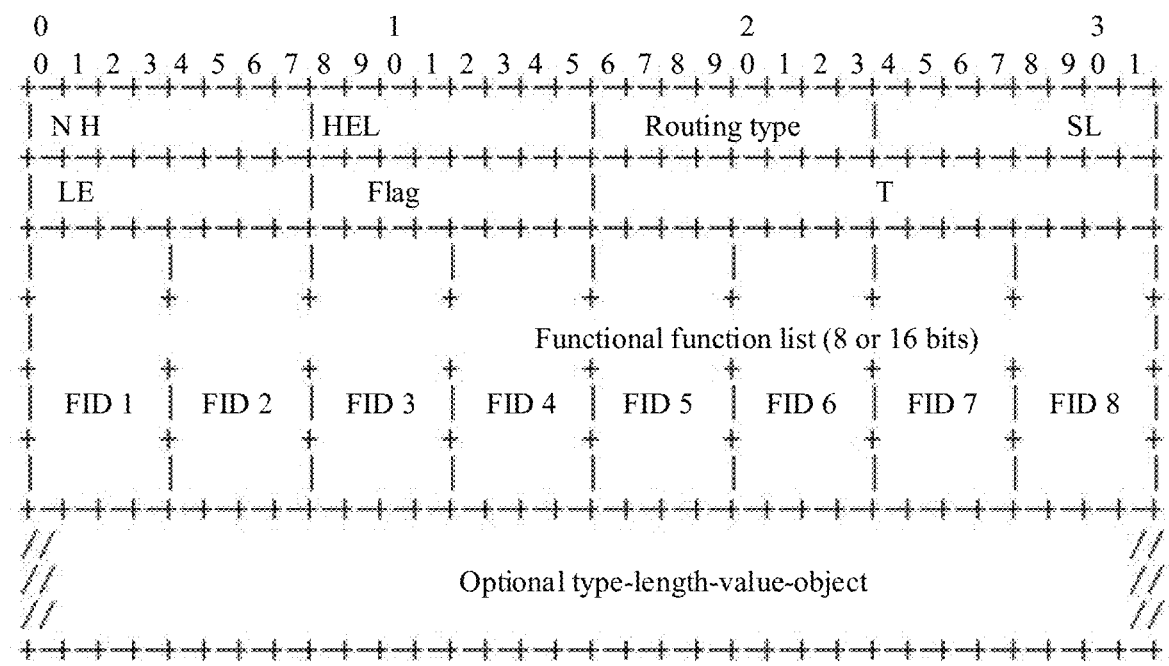
FIG. 8c is a schematic diagram of a format of an IPv6 packet header according to this application.

FIG. 8*c* is a schematic diagram of a format of an IPv6 packet header according to this application. As shown in FIG. 8*c*, a difference from FIG. 8*b* is that FIG. 8*c* includes more information before a functional function list field. For example, segments left is used to represent a FID pointer for indicating a valid FID, and last entry indicates a last FID. If Hdr Ext Len exceeds last entry, type length value object is valid.

In this embodiment of this application, the functional program may be placed by using the following three implementations.

1. If the functional program placed into the functional function list field in the IPv6 packet header shown in FIG. 8*a* is enough for support, a quantity of segments is limited to be less than or equal to 8, and in this case, the extension header shown in FIG. 8*b* is not used. If the functional program placed into the functional function list field in the IPv6 packet header shown in FIG. 8*a* is not enough for support, a quantity of segments is greater than 8, and in this case, the functional function list field of the extension header shown in FIG. 8*b* continues to be used to place a remaining functional program.

Figure 9A:
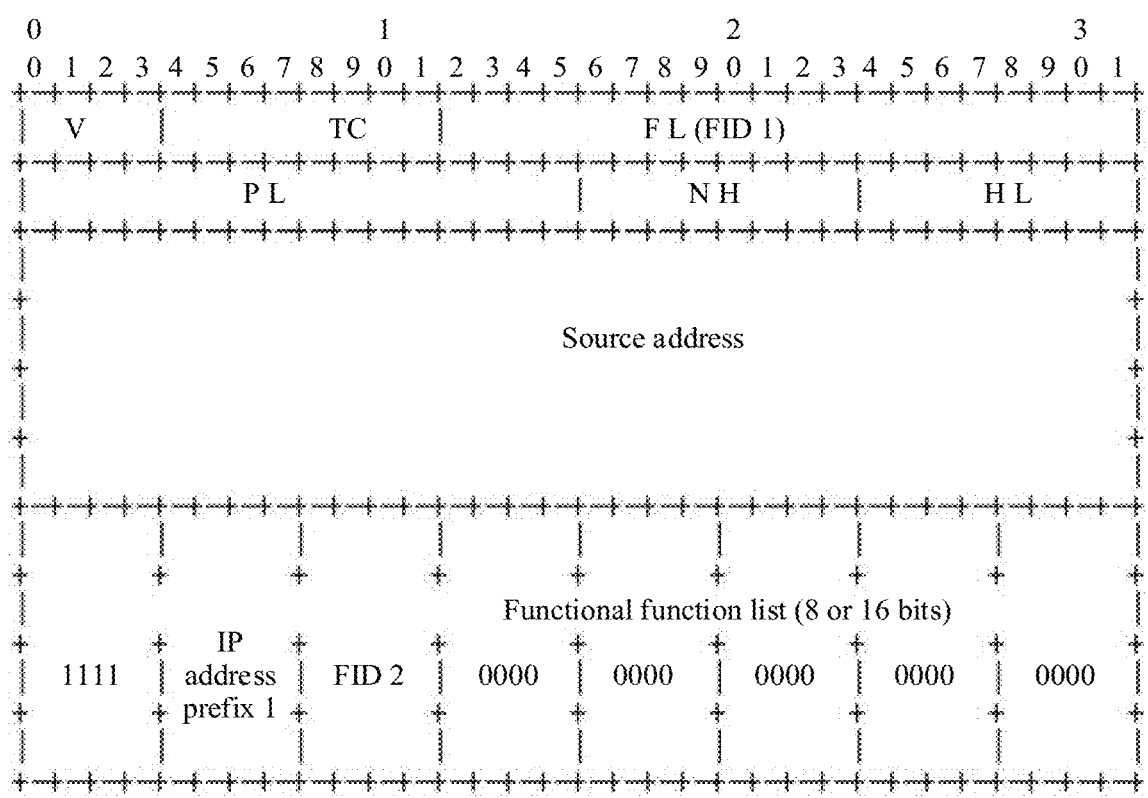
FIG. 9a is a schematic diagram of an operation on a functional function list field.

It should be emphasized that, to avoid a loss of a FID, a computing site or an egress router may need to use the FID to find a corresponding functional function instance. Therefore, optionally, after a packet enters a network, FIG. 9*a* is a schematic diagram of an operation on a functional function list field. As shown in FIG. 9*a*, an ingress router stores a first FID in another field (for example, a flow label field) other than a destination address of an IPv6 packet header, replaces the first FID with a corresponding IP address prefix, and then performs first segment routing and functional function processing corresponding to the first FID. A second segment is entered. The ingress router stores a second FID in another field (for example, a flow label field) other than a destination address of an IP packet header. FIG. 9b is a schematic diagram of an operation on a functional function list field. As shown in FIG. 9b, the second FID is replaced with a corresponding IP address prefix, and then second segment routing and functional function processing corresponding to the second FID are performed. An Nth segment is entered. The ingress router stores an Nth FID in another field (for example, a flow label field) other than a destination address of an IPv6 packet header, replaces the Nth FID with a corresponding IP address prefix, and then performs N segment routing and functional function processing corresponding to the Nth FID.

2. The functional program is placed only in the functional function list field of the extension header in FIG. 8b. The functional function list field may exceed the FID 7 (not fully shown in the figure), a quantity of segments is greater than 8, and in this case, the destination address field in the IPv6 packet header still indicates a destination address.

3. The terminal device (for example, a client/user equipment) places the functional program in the functional function list field in the IPv6 packet header shown in FIG. 8a, to add the functional program to a network or a computing site. After a packet enters the network, the ingress router adds the extension header shown in FIG. 8b, and copies the functional program to the functional list field.

In this embodiment of this application, a new addressing manner of an SRv6 system is provided. It is assumed that a service is represented by a URI or an application software name. For a client/application (Application), the URI, the application software name, or a functional function name are visible. This is irrelevant to a location in which a functional function instance or a computing container is located.

For a network device (for example, a router), a FID and an IP subnet/IP address prefix (IP address prefix) of a computing container in which the FID is located are visible. The FID may be represented in an IP suffix (IP suffix) form, and may be an anycast ID (Anycast ID). One FID may be mapped to a group of functional peer instances. The IP subnet/IP address prefix is related to a location of the computing container. In this application, a virtual router is introduced into the computing container to obtain a computing status of the computing site. An IP subnet between a leaf switch and a virtual router needs to be configured on a DC leaf switch, and the subnet is the IP subnet/IP address prefix of the computing container in which the FID is located. If implementation 1 or 2 is used, a quantity of bits of the IP subnet/prefix should be consistent with a quantity of FID bits. For example, if the quantity of FID bits is set to 16 bits, the quantity of bits of the IP subnet/prefix should also be set to 16 bits. For a router (or a virtual router) closest to the functional function instance, the FID, the IP subnet/IP address prefix of the computing container in which the FID is located, and a hash value are visible.

S102: The ingress routing device determines, based on a FIB or a RIB, one of an IP address prefix, an egress routing device address, or an egress port corresponding to a sequentially placed first FID, and forwards the packet based on the determined one of the IP address prefix, the egress routing device address, or the egress port.

Specifically, in an implementation, S102 may be:

The ingress routing device searches the FIB or the RIB for the IP address prefix corresponding to the first FID, adds the IP address prefix to the first FID to obtain an IP address, and forwards the packet by using the IP address as a destination IP address, replaces the first FID with the IP address prefix corresponding to the first FID, and forwards the packet based on the IP address prefix, or stores the first FID in another field other than the destination address of the IP packet header, replaces the first FID with the IP address prefix corresponding to the first FID, and forwards the packet based on the IP address prefix. The first FID is stored herein, to avoid a loss of the first FID.

In another implementation, S102 may be:

The ingress routing device searches the FIB or the RIB for an egress routing device address corresponding to the FID, adds tunnel encapsulation to the packet by using the egress routing device address as a tunnel destination address, and the ingress routing device sends the packet to which the tunnel encapsulation is added to an egress routing device.

In still another implementation, S102 may be:

The ingress routing device searches the FIB or the RIB for an egress port corresponding to the FID, and outputs the packet based on the egress port.

It should be noted that, the ingress routing device determines, based on the FIB or the RIB, the IP address prefix, the egress routing device address, or the egress port corresponding to the first FID. The first FID herein is a first valid FID. For example, the functional function list field stores the FID 0, the FID 1, . . . , and the FID 7. The FID 0 is a start identifier, and the first valid FID is the FID 1. Therefore, an IP address prefix, an egress routing device address, or an egress port corresponding to the FID 1 is determined.

It should be noted that, the ingress routing device first searches the FIB for the IP address prefix, the egress routing device address, or the egress port corresponding to the first FID. Searching may be performed according to a longest prefix matching rule. If the first FID entry does not exist in the FIB, the ingress routing device searches the RIB, and selects or computes a route entry based on a computing metric value to obtain the IP address prefix, the egress routing device address, or the egress port corresponding to the first FID.

Further, before forwarding the packet by using the IP address as a destination IP address, or before forwarding the packet based on the IP address prefix, the method in this embodiment may further include:

The ingress routing device performs a hash operation based on a multi-tuple to obtain a hash value, and places the hash value into another field (for example, a flow label field) of the IPv6 extension header or another field (for example, a flow label field), other than the destination address, of the IPv6 packet header. For example, the hash operation is performed based on a 5-tuple to obtain a hash value, and the hash value is used to distinguish a plurality of functional function instances of a same FID on a same computing container (for example, a server). Alternatively, the ingress routing device obtains a hash value carried in the packet, and searches, based on the hash value, an output IP address prefix, an egress routing device address, or an egress port that is of a hash table stored by the ingress routing device and that is corresponding to the hash value.

It should be noted that, when the SRv6 system provided in this application needs to perform mapping from the URI, the application software name, or the functional program name to the FID, the mapping may be completed through support by upgrading a DNS system, or completed through hash mapping.

In this embodiment, for the ingress router, the FIB includes: a correspondence between a FID, and an output IP address prefix and an egress port, a correspondence between a FID, and an egress routing device address and an egress port, a correspondence between a FID and an egress port, or a correspondence between a FID and a hash table-related parameter, where the hash table-related parameter includes a start location and/or a total quantity of entries in a hash table. The RIB includes: a correspondence between a FID, and a computing metric value, an output IP address prefix, and an egress port, a correspondence between a FID, and a computing metric value, an egress routing device address, and an egress port, a correspondence between a FID, and a computing metric value and an egress port, or a correspondence between a FID and a hash table-related parameter, where the hash table-related parameter includes a start location and/or a total quantity of entries in a hash table.

Further, before S101, the method in this embodiment may further include the following steps.

S103: The ingress routing device obtains, from the computing container, a FID or an IP address prefix of a functional function instance supported by the computing container, or an egress routing device address, and a computing capacity or a computing status of the computing container, where the computing container is a server, a computing site, a virtual machine, or a container.

S104: The ingress routing device generates a corresponding computing metric value based on the computing capacity or the computing status of the computing container.

S105: The ingress routing device generates the RIB based on the computing metric value, and the FID or the IP address prefix of the functional function instance supported by the computing container, or the egress routing device address.

S106: The ingress routing device generates the FIB based on the RIB.

According to the segment routing method provided in this embodiment, after receiving the packet sent by the terminal device, the ingress routing device obtains the functional program corresponding to the packet of the terminal device. The functional program is used to indicate the n sequential computing processing steps/instructions, service processing steps/instructions, or network processing steps/instructions, and the functional program includes a plurality of FIDs. The ingress routing device determines, based on the forwarding information base FIB or the routing information base RIB, the IP address prefix, the egress routing device address, or the egress port corresponding to the first FID, and forwards the packet based on the determined IP address prefix, egress routing device address, or egress port. Therefore, "name-address mapping" is delayed to a routing phase. A controller delivers only a FID list, instead of an IPv6 address list, that a user concerns to the ingress routing device. "name" in "name-address mapping" is a FID and "address" is an IPv6 address. The ingress routing device performs addressing or routing based on the FID to obtain a computing host/service IP address with a shortest actual delay or a strongest computing capability. It is not allocating a destination IP address before the routing phase. This can resolve address inconsistency caused by dynamic changes in service location of a computing host.

FIG. 10 is a flowchart of an embodiment of a segment routing method according to this application. As shown in FIG. 10, this embodiment may be performed by an egress routing device, for example, an egress router, and the method in this embodiment may include the following steps.

S201: An egress routing device receives a packet from an ingress routing device or an intermediate routing device, where the packet carries a functional program, the functional program is used to indicate one or more sequential computing processing steps/instructions, service processing steps/instructions, or network processing steps/instructions, the functional program includes one or more sequentially placed function identifiers FIDs, and each FID is used to represent one computing processing step/instruction, service processing step/instruction, or network processing step/instruction.

In this embodiment, the packet carries the functional program. Optionally, in a possible implementation, FIG. 6 is a schematic diagram of an IPv6 packet header according to this application. As shown in FIG. 6, a functional program may be placed into an IPv6 extension header. Optionally, computing-related data used by the functional program is placed into a payload field or the IPv6 extension header.

In another possible implementation, FIG. 7 is a schematic diagram of another IPv6 packet header according to this application. As shown in FIG. 7, a functional program may be placed into a destination address field of an IPv6 packet header, or the destination address field in the IPv6 packet header and an IPv6 extension header. Optionally, computing-related data used by the functional program is placed into a payload field or the IPv6 extension header.

S202: The egress routing device determines, based on a FIB or a RIB, an egress port corresponding to a first sequentially placed FID and/or an egress port corresponding to an IP address prefix corresponding to the FID.

It should be noted that, the egress routing device first searches the FIB for the egress port corresponding to the first FID and/or the egress port corresponding to the IP address prefix corresponding to the FID. Searching may be performed according to a longest prefix matching rule. If the first FID entry does not exist in the FIB, the egress routing device searches the RIB, and selects or computes a route entry based on a computing metric value to obtain the egress port corresponding to the first FID and/or the egress port corresponding to the IP address prefix corresponding to the FID.

S203: The egress routing device outputs the packet to a computing container through the egress port, to enable the computing container to perform functional function processing corresponding to the FID, where the computing container is a server, a computing site, a virtual machine, or a container.

Further, the method may further include the following steps.

S204: The egress routing device shifts the plurality of FIDs included in the functional program, deletes a processed FID, and pads 0 after a last bit is shifted; or the egress routing device shifts the plurality of FIDs included in the functional program, deletes a processed FID, pads 0 after a last bit is shifted, and deletes an IPv6 extension header in which the functional program is located after functional function processing corresponding to all the FIDs is completed.

In this embodiment, that the IPv6 extension header in which the functional program is located is deleted may be executed by the egress routing device, or may be executed by the computing container.

Optionally, if tunnel encapsulation is added to the packet from the ingress routing device or the intermediate routing device, correspondingly, before determining, by the egress routing device based on the forwarding information base FIB or the routing information base RIB, the egress port corresponding to the first FID and/or the egress port corresponding to the IP address prefix corresponding to the FID, the method in this embodiment may further include:

The egress routing device decapsulates the packet.

Optionally, if the packet from the ingress routing device or the intermediate routing device carries a hash value, the method in this embodiment may further include:

The egress routing device obtains the hash value carried in the packet, and searches, based on the hash value, an IP address prefix and/or an egress port that are/is of a hash table stored by the egress routing device and that are/is corresponding to the hash value.

In this embodiment, the FIB includes: a correspondence between a FID, and an input IP address prefix and an egress port, a correspondence between a FID and an egress port, or a correspondence between a FID and a hash table-related parameter, where the hash table-related parameter includes a start location and/or a total quantity of entries in a hash table.

The RIB includes: a correspondence between a FID, and a computing metric value, an input IP address prefix, and an egress port, a correspondence between a FID, and a computing metric value and an egress port, or a correspondence between a FID, and a computing metric value and a hash table-related parameter, where the hash table-related parameter includes a start location and/or a total quantity of entries in a hash table.

Further, before S201, the method in this embodiment may further include the following steps.

S205: The egress routing device obtains, from the computing container, a FID or an IP address prefix of a functional function instance supported by the computing container, or an egress routing device address, and a computing capacity or a computing status of the computing container.

S206: The egress routing device generates a corresponding computing metric value based on the computing capacity or the computing status of the computing container.

S207: The egress routing device generates the RIB based on the computing metric value, and the FID or the IP address prefix of the functional function instance supported by the computing container, or the egress routing device address.

S208: The egress routing device generates the FIB based on the RIB.

According to the segment routing method provided in this embodiment, the egress routing device receives the packet from the ingress routing device or the intermediate routing device. The packet carries the functional program, and the functional program is used to indicate m sequential computing processing steps/instructions, service processing steps/instructions, or network processing steps/instructions, and the functional program includes the plurality of FIDs. The egress routing device determines, based on the forwarding information base FIB or the routing information base RIB, the egress port corresponding to the first FID and/or the egress port corresponding to the IP address prefix corresponding to the FID. The egress routing device outputs the packet to the computing container through the egress port, to enable the computing container to perform functional function processing corresponding to the FID, where the computing container is the server, the computing site, the virtual machine, or the container. Therefore, "name-address mapping" is delayed to a routing phase. "name" in "name-address mapping" is a FID and "address" is an IPv6 address. The egress routing device performs addressing or routing based on the FID to obtain a computing host/service IP address with a shortest actual delay or a strongest computing capability. It is not allocating a destination IP address before the routing phase. This can resolve address inconsistency caused by dynamic changes in a service location of a computing host.

The following describes the technical solutions of the method embodiments shown in FIG. 5 and FIG. 10 in detail by using several specific embodiments. In the following embodiments, an example in which an ingress routing device is an ingress router and an egress routing device is an egress router is used for description.

First, English abbreviations related to FIG. 8a, FIG. 8b, FIG. 8c, FIG. 9a, FIG. 9b, FIG. 12, FIG. 14a, FIG. 14b, FIG. 14c, and FIG. 14d are explained in detail: a version (version, V), a traffic class (Traffic Class, TC), a flow label (Flow Label, FL), a payload length (Payload Length, PL), a next extension header (Next Extension Header, NH), a hop limit (Hop Limit, HL), a next extension header length (Hdr Ext Len, HEL), a routing type (Routing Type), flags (Flags), optional type-length-value-object (Optional Type Length Value object), segments left (Segments Left, SL), a last entry (Last Entry, LE), and a tag (Tag, T).

Figure 11:
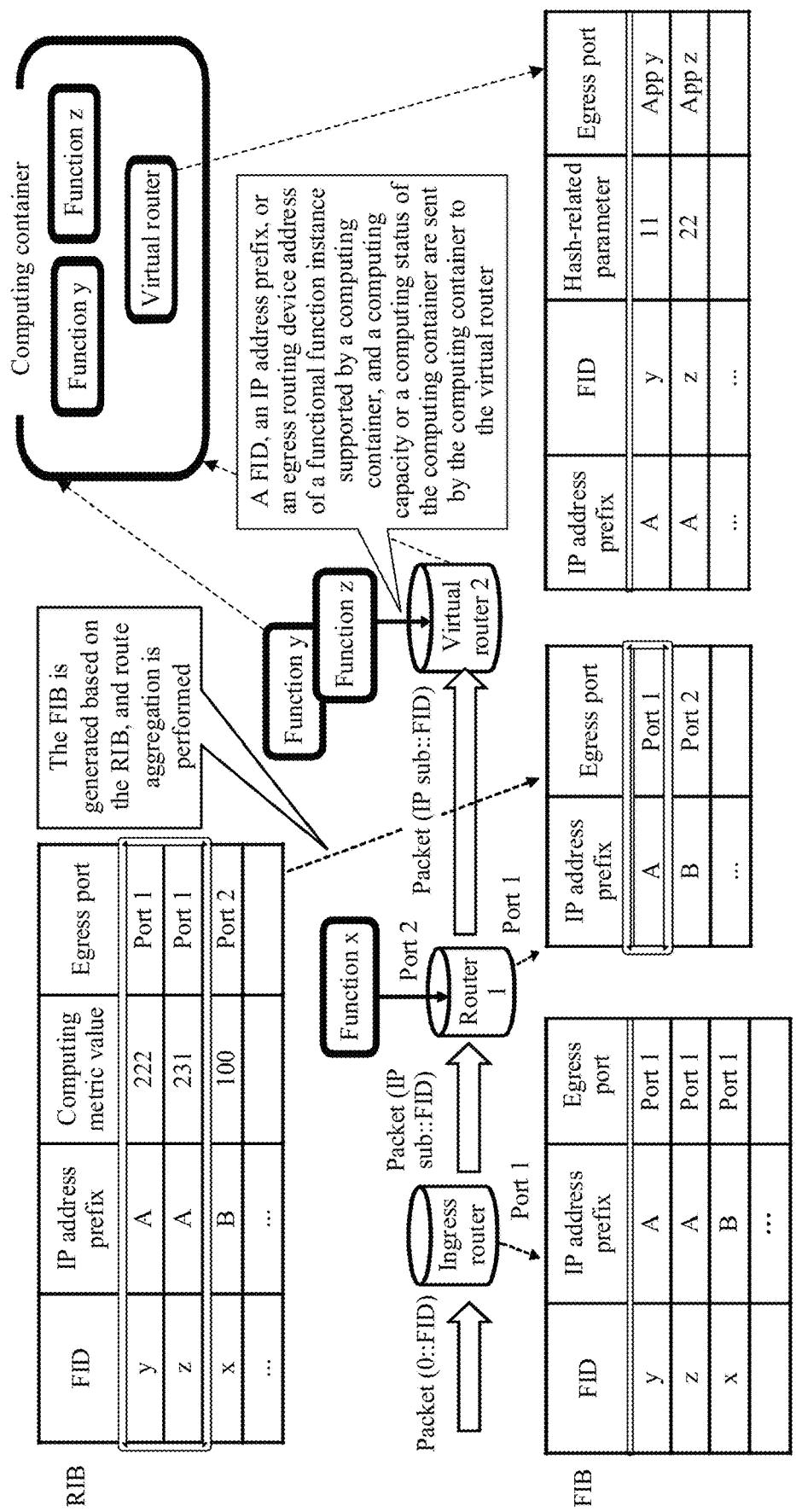
FIG. 11 is a schematic diagram of a routing table design of an SRv6 system according to this application.

FIG. 11 is a schematic diagram of a routing table design of an SRv6 system according to this application. As shown in FIG. 11, each router in the system, regardless of a hardware router or a software router (for example, a virtual router), maintains a RIB and a FIB. The virtual router in FIG. 11 is usually an egress router. For example, an SRv6 path is divided into two segments. A destination address of a first segment is a router 1 (the router 1 is an egress router), and a destination address of a second segment is a functional function y (the virtual router is an egress router). Ingress and egress are intended for a terminal device. A first router close to the terminal device is referred to as an ingress router, and a last router is referred to as an egress router.

For content included in a RIB and a FIB respectively corresponding to the ingress router, the egress router, and an intermediate router, refer to the description in the foregoing embodiment. Details are not described herein again.

With reference to FIG. 11, the following is a process of Embodiment 1 of a segment routing method according to this application. A processing process of a first segment is described in this embodiment, and a processing process of another segment is similar. The method in this embodiment may include the following steps.

S301: A FID or an IP address prefix of a functional function instance supported by a computing container, or an egress routing device address, and a computing capacity or a computing status of the computing container are sent by the computing container to the virtual router, and are eventually obtained by routers in a network.

Specifically, the virtual router sends, to another router connected to the virtual router, the FID or the IP address prefix of the functional function instance supported by the computing container, or the egress routing device address, and the computing capacity or the computing status of the computing container. The virtual router (software) interacts with the another router according to a routing protocol. The virtual router is directly connected to the another router when the virtual router is hardware.

S302: The routers in the network generate a computing metric value based on the computing capacity or the computing status of the computing container, generate RIBs based on the computing metric value, and the FID or the IP address prefix (sub for short in FIG. 11) of the functional function instance supported by the computing container, or the egress routing device address, and generate FIBs based on the RIBs.

S303: After receiving a packet of a terminal device, the ingress routing device obtains a functional program corresponding to the packet of the terminal device, where the functional program is used to indicate n sequential computing processing steps/instructions, service processing steps/instructions, or network processing steps/instructions, the functional program includes a plurality of function identifiers FIDs, and each FID is used to represent one computing processing step/instruction, service processing step/instruction, or network processing step/instruction.

Specifically, optionally, if the packet of the terminal device does not carry the FID, the ingress router needs to obtain the functional program from a controller or a network management system, and place the functional program into a functional function list field. This requires cooperation from the controller or the network management system.

Optionally, the packet of the terminal device carries the FID. A client directly obtains the functional program; may send a request packet that carries a URI, an application software name, or a service name to a DNS; obtains the corresponding functional program from the response packet of the DNS; and places the functional program into the functional function list field in the IPv6 packet header shown in FIG. 8a. This is used to add the functional program to the network or a computing site. The ingress router adds the extension header shown in FIG. 8b, and copies the functional program from the functional function list field in the IPv6 packet header shown in FIG. 8a to the functional function list field of the extension header shown in FIG. 8b.

S304: After the ingress router obtains a functional program={FID 1, FID 2, . . . }, the ingress router searches the FIB (data plane) based on the FID, and if the FID 1 entry does not exist in a FIB table, searches the RIB. Specifically, the ingress router selects or computes a route entry based on the computing metric value to obtain the IP address prefix, the egress router address, or the egress port corresponding to the FID. For example, the ingress router may select an IP address prefix corresponding to a minimum computing metric value, to form a FIB entry, for example, a FIB shown in the lower left corner of FIG. 11, that is forwarded based on the FID.

When a subsequent packet enters, the ingress router searches the FIB according to a longest prefix matching rule, (because a corresponding FIB entry already exists at this time) and obtains an IP address prefix (for example, an IP address prefix 1) corresponding to the FID=FID 1, and S305 may be directly performed.

S305: The ingress router adds a prefix to the FID to obtain an IP address, namely, IP sub:FID1 in FIG. 11, and then forwards the packet by using the address as a destination IP address; or uses an IP address of the egress router as a tunnel destination address to add tunnel encapsulation to the packet, and sends the packet from the ingress router to the egress router. In this case, S306 is bypassed, and S307 is entered.

Usually, the address IP sub:FID1 is an IP address of the functional function instance. When there are a plurality of functional function instances with a same FID, the FID is equivalent to an anycast ID. Usually, a DC plans an IP address prefix for a leaf switch port. Functional function instances with a same FID between computing sites and between leaf switch ports are distinguished by using IP address prefixes, and functional function instances with a same FID within a leaf switch port are distinguished by using hash values or by a load balancer inside a computing site.

Optionally, the ingress router performs a hash (hash) operation based on a multi-tuple (for example, a 5-tuple) carried in the packet to obtain a hash value, to distinguish a plurality of functional function instances with a same FID on a same computing container (for example, a server). The hash value may be carried in another field (for example, a flow label field) of an IPv6 extension header or another field (for example, a flow label field), other than a destination address, of an IPv6 packet header. The ingress routing device obtains, by using the foregoing process, the hash value carried in the packet, and searches, based on the hash value, an output IP address prefix, an egress routing device address, or an egress port that is of a hash table stored by the ingress routing device and that is corresponding to the hash value.

S306: When a packet carrying IP sub:FID1 passes through an intermediate router, the router searches the FIB according to the longest prefix matching rule; if the IP sub entry does not exist in the FIB table, searches the RIB; and selects or computes a route entry based on the computing metric value to obtain an optimal destination IP address prefix and an optimal egress port that are corresponding to the FID. Because entries with a same IP address prefix may be aggregated, a FIB, for example, a FIB table shown in the middle of FIG. 11, that includes only the IP address prefix and the egress port can be obtained. Then, the router forwards the packet through the egress port. A subsequent packet enters. The router searches the FIB according to the longest prefix matching to obtain an egress port, and outputs the packet through the egress port.

S307: When the packet carrying IP sub: FID1 passes through the egress router, if tunnel encapsulation is added to the packet, the tunnel encapsulation is deleted. The egress router searches the FIB based on an IP address prefix (subnet) and/or the FID carried in the packet; if the IP sub entry and/or the FID 1 entry do/does not exist in the FIB table, searches the RIB; and selects or computes a route entry based on the computing metric value to obtain an optimal destination IP address prefix and an optimal egress port that are corresponding to the FID.

Optionally, the egress router obtains the hash value carried in the packet, and combines the hash value with the IP address prefix and/or the IP address prefix and the egress port to form a FIB, for example, a FIB table in the lower right corner of FIG. 11. Then, the packet is forwarded through the egress port, and reaches the computing site for functional function processing corresponding to the FID 1.

S308: The egress router or the computing container shifts the FID 2 field, . . . , and a FID 8 field to the left to delete the FID 1, and pads 0 after a last bit is shifted. If the functional function list is all 0s, it indicates that all functional function processing is completed. In this case, the IPv6 extension header in which the functional program is located is deleted.

Figure 12:
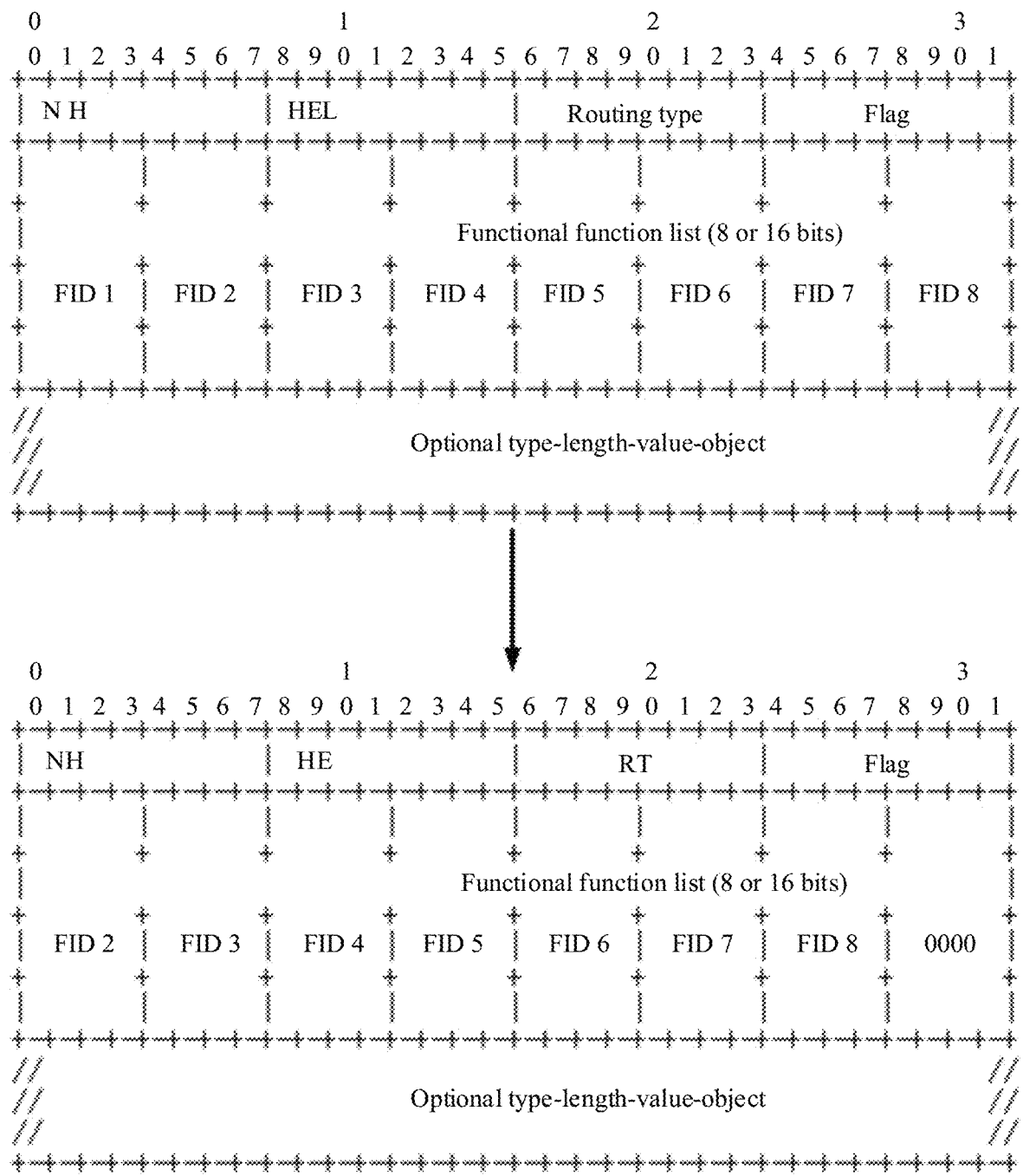
FIG. 12 is a schematic diagram of deleting a FID 1 in a functional function list in an SRH through shifting.

A subsequent packet enters. The egress router searches the FIB based on the IP address prefix and/or the FID to obtain an egress port, and outputs the packet through the egress port. The packet reaches the computing site for the functional function processing corresponding to the FID 1. Similarly, as shown in FIG. 12, an egress router/a computing site supporting SR deletes the FID 1 by shifting a FID 2 field, . . . , and a FID 8 field to the left, and pads 0 after a last bit is shifted. (FIG. 12 is a schematic diagram of deleting a FID 1 in a functional function list in an SRH through shifting). If the functional function list is all 0s, it indicates that all functional function processing is completed. In this case, an IPv6 extension header in which a functional program is located is deleted.

With reference to FIG. 11, the following is a process of Embodiment 2 of a segment routing method according to this application. A processing process of a first segment is described in this embodiment, and a processing process of another segment is similar. The method in this embodiment may include the following steps.

S401 and S402 are the same as S301 and S302. For details, refer to the same description. Details are not described herein again. Optionally, in this embodiment, it is required that an IP address prefix of a computing container be FID0:IP subnet::/32, namely, 1111:IP subnet1::/32. To be specific, an IP subnet is prefixed with a start character FID0=1111::/16. It is assumed that a FID is 16 bits, 8 bits, or 32 bits herein.

S403: After receiving a packet of a terminal device, an ingress routing device obtains a functional program corresponding to the packet of the terminal device, where the functional program is used to indicate n sequential computing processing steps/instructions, service processing steps/instructions, or network processing steps/instructions, the functional program includes a plurality of function identifiers FIDs, and each FID is used to represent one computing processing step/instruction, service processing step/instruction, or network processing step/instruction.

Specifically, optionally, if the packet of the terminal device does not carry the FID, the ingress router needs to obtain the functional program from a controller or a network management system, and place the functional program into a functional function list field. This requires cooperation from the controller or the network management system. It is assumed that an SR path is divided into two segments. The functional program={FID 1, FID 2}, and the IPv6 packet header shown in FIG. 8a is obtained.

Optionally, the packet of the terminal device carries the FID. A client directly obtains the functional program; may send a request packet that carries a URI, an application software name, or a service name to a DNS; obtains the corresponding functional program from the response packet of the DNS; and places the functional program into the functional function list field in the IPv6 packet header shown in FIG. 8a. This is used to add the functional program to a network or a computing site. It is assumed that an SR path is divided into two segments. The functional program={FID 1, FID 2}, and the IPv6 packet header shown in FIG. 8a is obtained.

S404: After the ingress router obtains a functional program={FID 1, FID 2, . . . }, the ingress router searches the FIB according to a longest prefix matching rule (In this example, FID0:FID1=1111:FID2 is used to perform longest prefix matching, and it is similar hereinafter); if the FID 1 entry does not exist in a FIB table (In this example, an entry 1111:FID1 does not exist), searches the RIB; and selects or computes a route entry based on a computing metric value to obtain an IP address prefix or an egress port corresponding to the FID. For example, the ingress router may select an IP address prefix (for example, an IP subnet 1) corresponding to a minimum computing metric value, to form a FIB entry, for example a FIB in the lower left corner of FIG. 11, that is forwarded based on the FID.

When a subsequent packet enters, the ingress router searches the FIB according to the longest prefix matching rule, (because a corresponding FIB entry already exists at this time) and obtains an IP address prefix (for example, the IP subnet 1) corresponding to the FID=FID 1, and S305 may be directly performed.

S405: The ingress router places the IP address prefix (for example, the IP subnet 1) into a field in which the original FID 1 is located, as shown in FIG. 8b, and then forwards the packet.

To avoid a loss of the FID, the computing site or an egress router may need to use the FID to find a corresponding functional function instance. Optionally, the ingress router stores the first FID (for example, the FID 1) into a flow label field of an IP packet header, as shown in FIG. 8b, and replaces the first FID (for example, the FID 1) with the corresponding IP address prefix (for example, the IP subnet 1).

Optionally, the ingress router performs hash based on a multi-tuple (for example, a 5-tuple) carried in the packet to obtain a hash value, to distinguish a plurality of functional function instances with a same FID on a same computing container (for example, a server). The hash value may be carried in an IPv6 extension header or another field.

S406: When a packet carrying an IP address prefix 1 passes through an intermediate router, the router searches the FIB according to the longest prefix matching; if the IP address prefix 1 entry does not exist in the FIB table, searches the RIB; and selects or computes a route entry based on the computing metric value to obtain an optimal destination IP address prefix and an optimal egress port that are corresponding to the FID. Because entries with a same IP address prefix may be aggregated, a FIB, for example, a FIB table shown in the middle of FIG. 11, that includes only the IP address prefix and the egress port can be obtained. Then, the router forwards the packet through the egress port. A subsequent packet enters. The router searches the FIB according to the longest prefix matching to obtain an egress port, and outputs the packet through the egress port.

S407: When the packet carrying the IP address prefix 1 passes through the egress router, the egress router searches the FIB based on the IP address prefix 1 and/or the FID 1 carried in the packet; if the IP address prefix 1 entry and/or the FID 1 entry do/does not exist in the FIB table, searches the RIB; and selects or computes a route entry based on the computing metric value to obtain an optimal destination IP address prefix and an optimal egress port that are corresponding to the FID.

Optionally, the egress router obtains the hash value carried in the packet, and combines the hash value with the IP address prefix and/or the IP address prefix and the egress port to form a FIB, for example, a FIB table in the lower right corner of FIG. 11.

Then, the packet is forwarded through the egress port, and reaches the computing site for functional function processing corresponding to the FID 1.

The egress router or a computing site supporting SR shifts the FID 2 field, . . . , and a FID 8 field to the left to delete the FID 1, and pads 0 after a last bit is shifted. If the functional function list is all 0s, it indicates that all functional function processing is completed. In this case, the SRv6 extension header is deleted.

A subsequent packet enters. The egress router searches the FIB based on the IP subnet 1 and/or the FID 1 to obtain an egress port, and outputs the packet through the egress port. The packet reaches the computing site for the functional function processing corresponding to the FID 1. Similarly, the egress router or the computing site supporting SR shifts a FID 2 field, . . . , and a FID 8 field to the left to delete a FID 1, and pads 0 after a last bit is shifted. If a functional function list is all 0s, it indicates that all functional function processing is completed. In this case, an SRv6 extension header is deleted.

Figure 13:
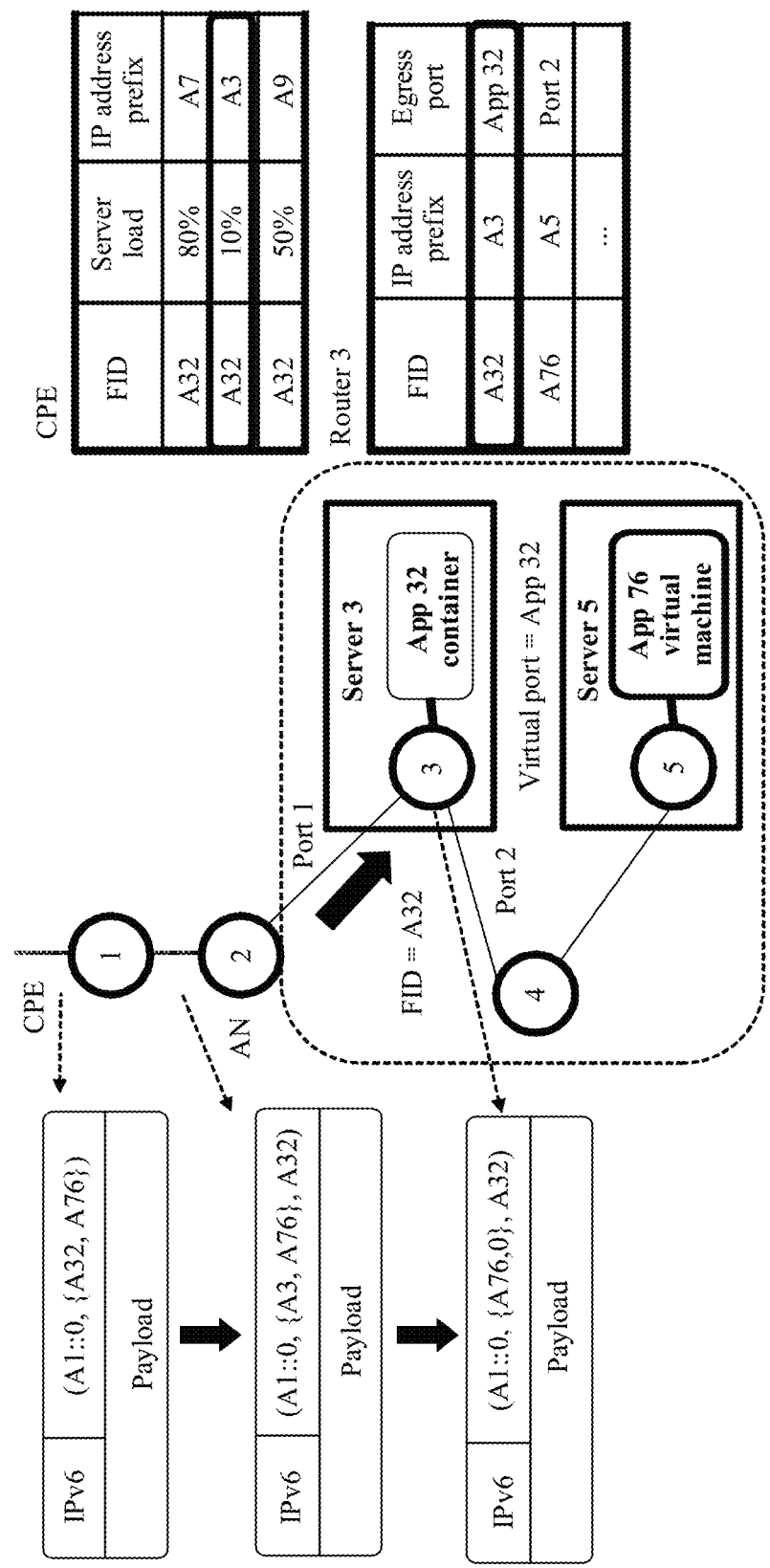
FIG. 13 is a flowchart of a first part of an embodiment of a segment routing method according to this application.

FIG. 13 is a flowchart of a first part of an embodiment of a segment routing method according to this application. As shown in FIG. 13, in this embodiment, a metropolitan area network is used as an example. A client/user equipment accesses the network by using customer-premises equipment (customer-premises equipment, CPE). The CPE may be an enterprise network access router, a home gateway, or a micro base station. An access node (Access node, AN) may be a digital subscriber line access multiplexer (Digital subscriber line access multiplexer, DSLAM), an optical line terminal (optical line terminal, OLT), or a base station. The AN (2) in FIG. 13 and the CPE ((1) in FIG. 13) are equivalent to ingress routers. It is assumed that an SRv6 path includes two segments. A first segment passes from the CPE to a router 3/server 3 ((3) in FIG. 13), and then first functional program processing is performed at the server 3. A second segment passes from the router 3 to a router 5/server 5 ((5) in FIG. 13), and then second functional program processing is performed at the server 5. The router 3 may run on the server 3, and the router 5 may run on the server 5. This is equivalent to a software-based virtual router. In this case, the CPE or the AN is an ingress router of the first segment, and the router 3 is an egress router of the first segment. The router 3 is an ingress router of the second segment, and the router 5 is an egress router of the second segment.

It is assumed that the server 3, the server 5, the router 3, a router 4 (namely, (4) in FIG. 13), and the router 5 are located in one edge computing site. In another embodiment, the server 3 and the router 3 may be located in one edge computing site, the server 5 and the router 5 are located in another edge computing/cloud computing site, and the router 4 is connected to the two computing sites. It is assumed that an IP subnet allocated to a leaf (leaf) switch port on which the server 3 is located is A3, and an IP subnet allocated to a leaf switch port on which the server 5 is located is A5.

As shown in FIG. 13, the method in this embodiment includes the following steps.

Figure 14A:
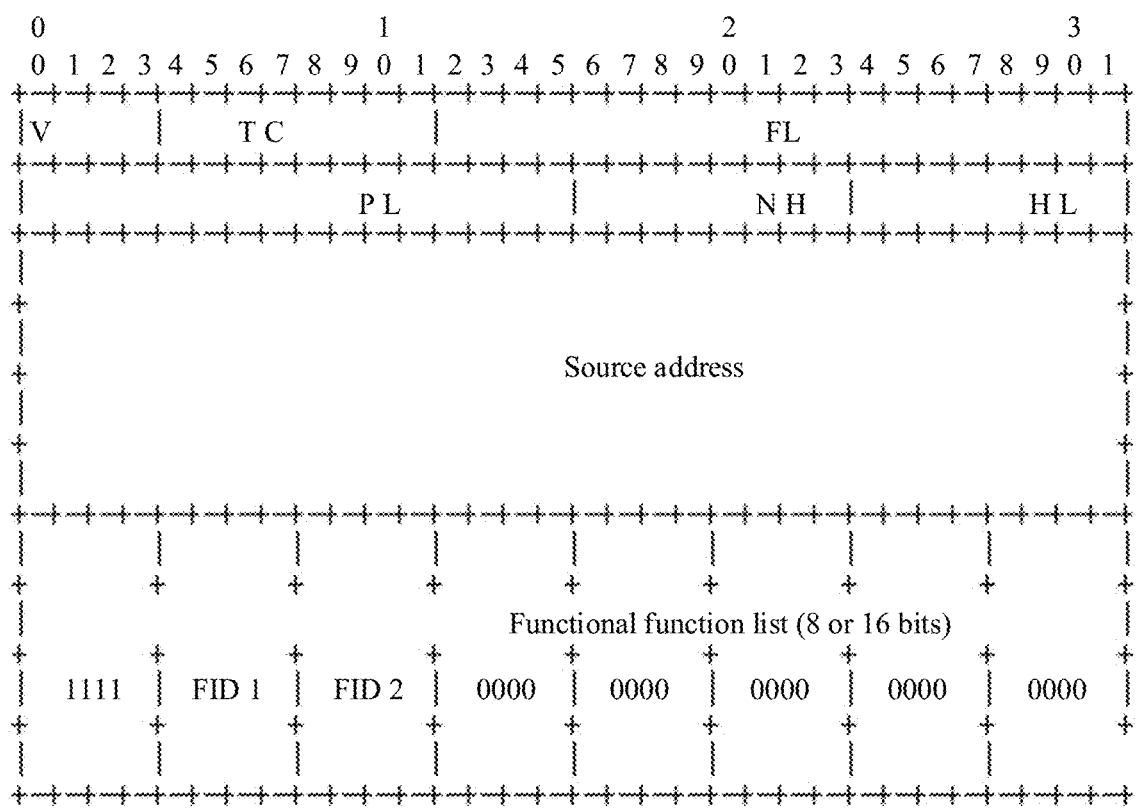
FIG. 14a is a schematic diagram of an IPv6 packet header.

S401: The client/user equipment outputs a packet. An IP over Ethernet (IP over Ethernet, IPoE) packet is used as an example, the client/user equipment may directly obtain a functional program; may further send a request packet that carries a URI, an application software name, or a service name to a DNS; obtains the corresponding functional program from the response packet of the DNS; and places the functional program into the functional function list field in the IPv6 packet header shown in FIG. 8a. This is used to add the functional program to a network or a computing site. It is assumed that an SR path is divided into two segments. A corresponding functional program={A32, A76}, where A32 and A76 are sequentially executed FIDs. A FID 1 is A32, and a FID 2 is A76. An IPv6 packet header shown in FIG. 14a is obtained. FIG. 14a is a schematic diagram of an IPv6 packet header.

Figure 14B:
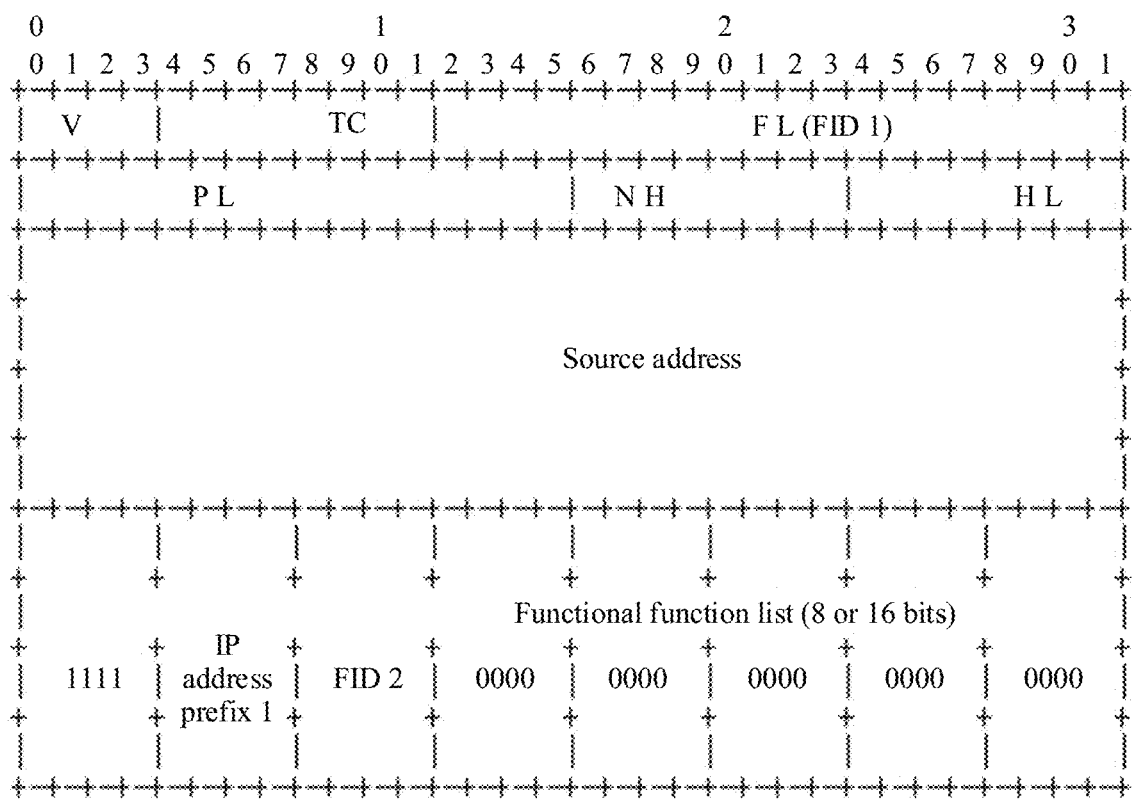
FIG. 14b is a schematic diagram of an operation of a functional list of an IP packet header.

S402: The ingress router CPE obtains the functional program={A32, A76}, and searches a RIB of the ingress router based on the FID=A32. It is assumed that a computing status is server load, a route entry is selected based on lightest load. To be specific, a route entry whose IP address prefix=A3 is selected, and a FIB is generated. Then, FIG. 14b is a schematic diagram of an operation of a functional list of an IP packet header. As shown in FIG. 14b, the ingress router copies the FID=A32 to a flow label field of the IP packet header, places the IP address prefix=A3 into a field in which the original FID 1 is located, that is, in FIG. 13, the functional list={A3, A76}, and then forwards the packet.

Figure 14C:
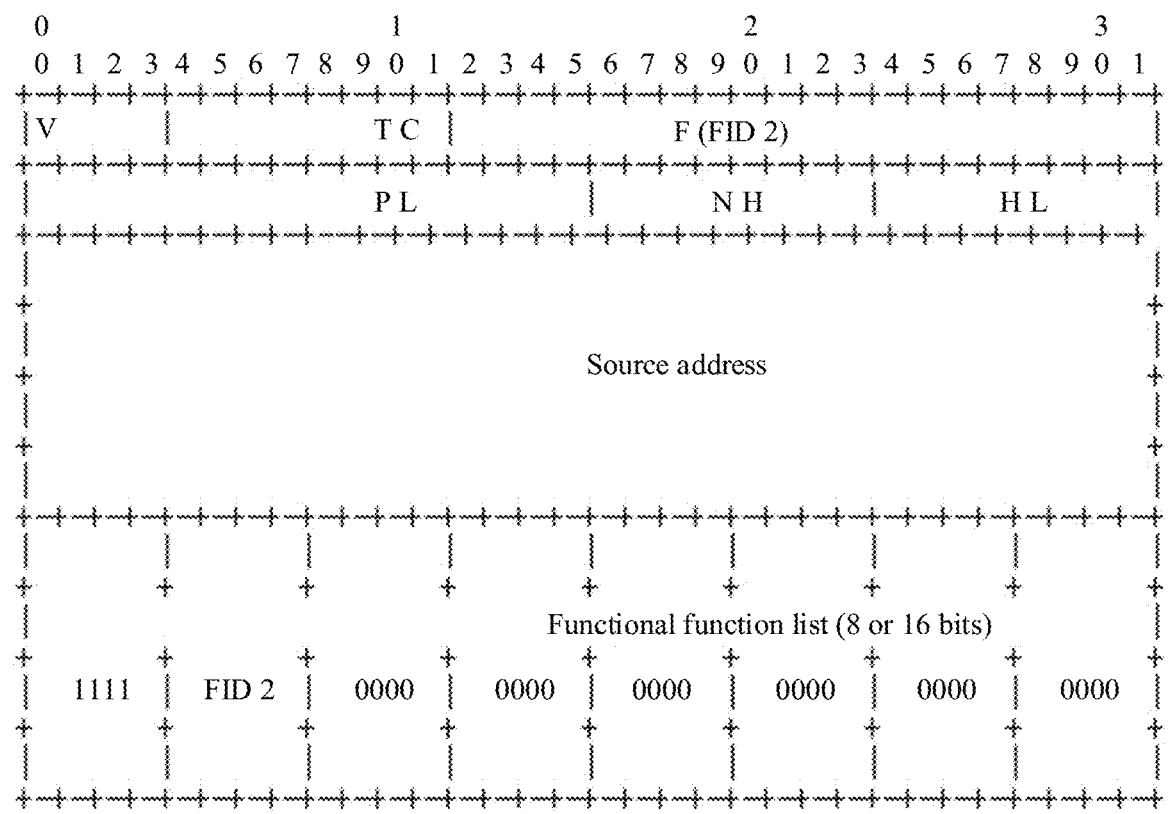
FIG. 14c is a schematic diagram of an operation of a functional list of an IP packet header.

S403: The packet arrives at the egress router (router 3), and the egress router searches the FIB based on the IP address prefix=A3 and/or the FID=A32 to obtain a virtual egress port=App 32, outputs the packet through the egress port, and forwards the packet to an App 32 container (Container) for functional function processing corresponding to the FID=A32. If the functional function corresponding to the FID 1 does not support SRv6, FIG. 14c is a schematic diagram of an operation of a functional list of an IP packet header. As shown in FIG. 14c, the egress router deletes the FID 1 by shifting the FID 2 field, . . . , and a FID 8 field to the left, and pads 0 after a last bit is shifted, that is, in FIG. 13, the functional list={A76, 0}. The deletion operation in FIG. 14c may be performed only after the functional function processing corresponding to the FID=A32 is completed, or may be performed in advance before the functional function processing corresponding to the FID=A32 is completed, to accelerate a processing speed.

Figure 15:
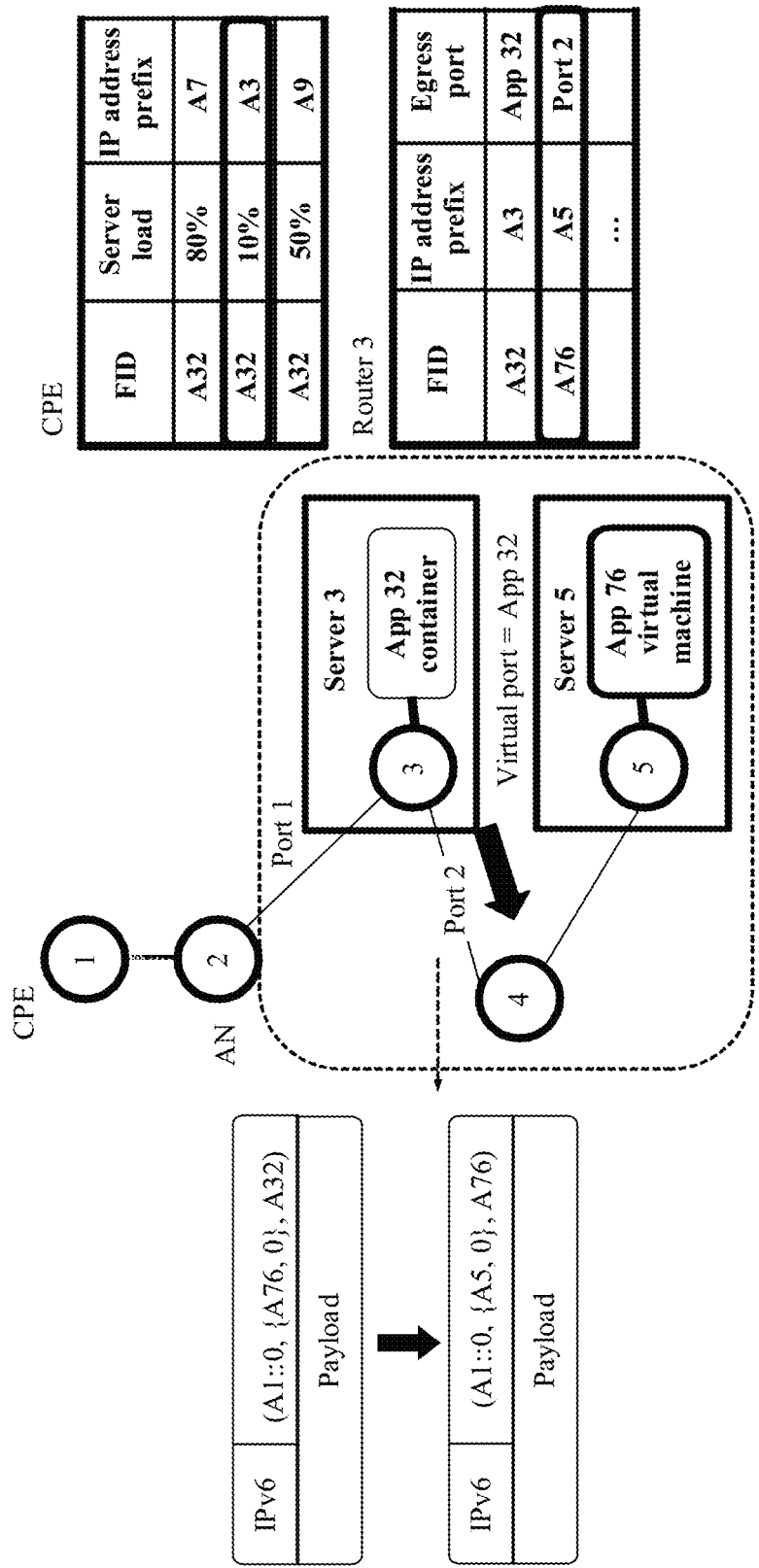
FIG. 15 is a flowchart of a second part of an embodiment of a segment routing method according to this application.

FIG. 15 is a flowchart of a second part of an embodiment of a segment routing method according to this application. As shown in FIG. 15, the method continues.

S404: If the functional function corresponding to the FID 1 supports SRv6, after the functional function processing of the computing site is performed as shown in FIG. 14c, the FID 1 is deleted by shifting the FID 2 field, . . . , the FID 8 field to the left, and 0 is padded after the last bit is shifted, that is, the functional function list in FIG. 11={A76, 0}. The App 32 container (Container) of the computing site may optionally select a corresponding functional function instance based on the FID 1 in the flow label field to perform corresponding functional function processing.

Figure 14D:
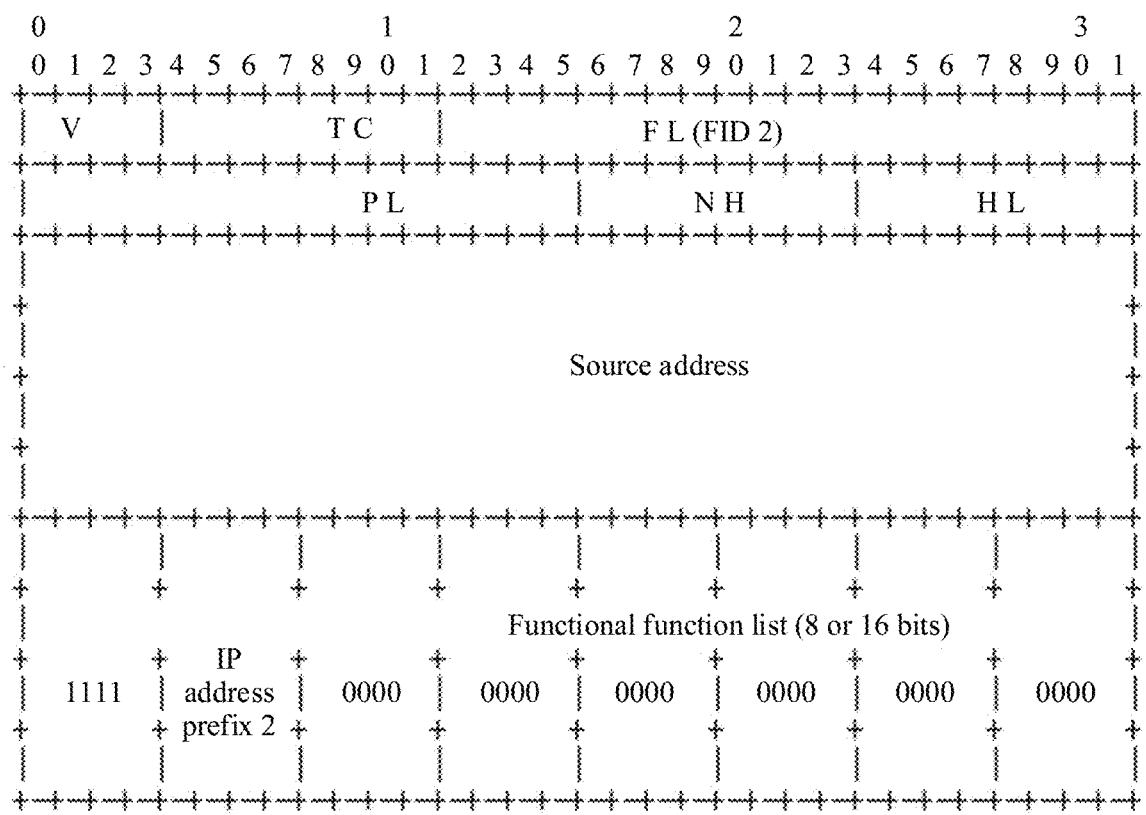
FIG. 14d is a schematic diagram of an operation of a functional list of an IP packet header.

S405: The ingress router obtains the functional program={A76, 0}, and searches the FIB based on the FID=A76, to obtain an IP address prefix=A5 and an egress port=a port 2 that are corresponding to A76. Then, FIG. 14d is a schematic diagram of an operation of a functional list of an IP packet header. As shown in FIG. 14d, the ingress router copies the FID=A76 to a flow label field of the IP packet header, places the IP address prefix=A5 into a field in which the original FID 1 is located, that is, in FIG. 11, the functional function list={A5, 0}, and then forwards the packet through the port 2.

Figure 16:
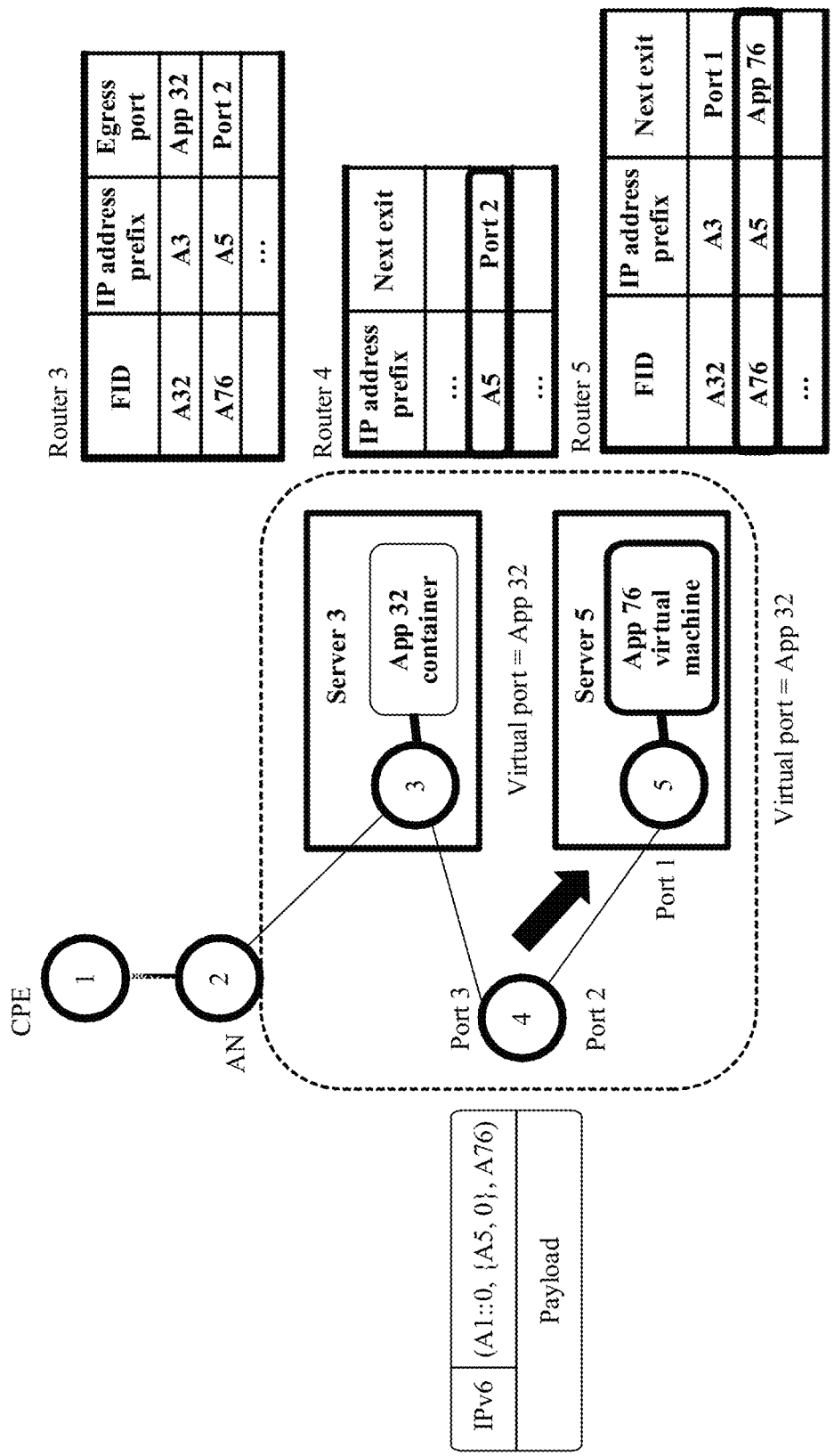
FIG. 16 is a flowchart of a third part of an embodiment of a segment routing method according to this application.

FIG. 16 is a flowchart of a third part of an embodiment of a segment routing method according to this application. As shown in FIG. 16, the method continues.

S406: The intermediate router (router 4) searches the FIB according to the longest prefix matching to obtain the egress port=port 2, and outputs the packet through the port 2.

S407: The packet arrives at the egress router, and the egress router (router 5) searches the FIB based on the IP address prefix=A5 and/or the FID=A76 to obtain a virtual egress port=App 76, outputs the packet through the egress port, and forwards the packet to an App 76 container (Container) for functional function processing corresponding to the FID=A76. If the functional function corresponding to the FID 1 does not support SRv6, as shown in FIG. 14c, the egress router deletes the FID 1 by shifting the FID 2 field, . . . , and the FID 8 field to the left, and pads 0 after the last bit is shifted, that is, a functional function list={0, 0} is obtained. If the functional function list is all 0s, it indicates that all functional function processing is completed. In this case, the SRv6 extension header that may exist is deleted. If the functional function corresponding to the FID 1 supports SRv6, the computing site performs the deletion operation.

Figure 17:
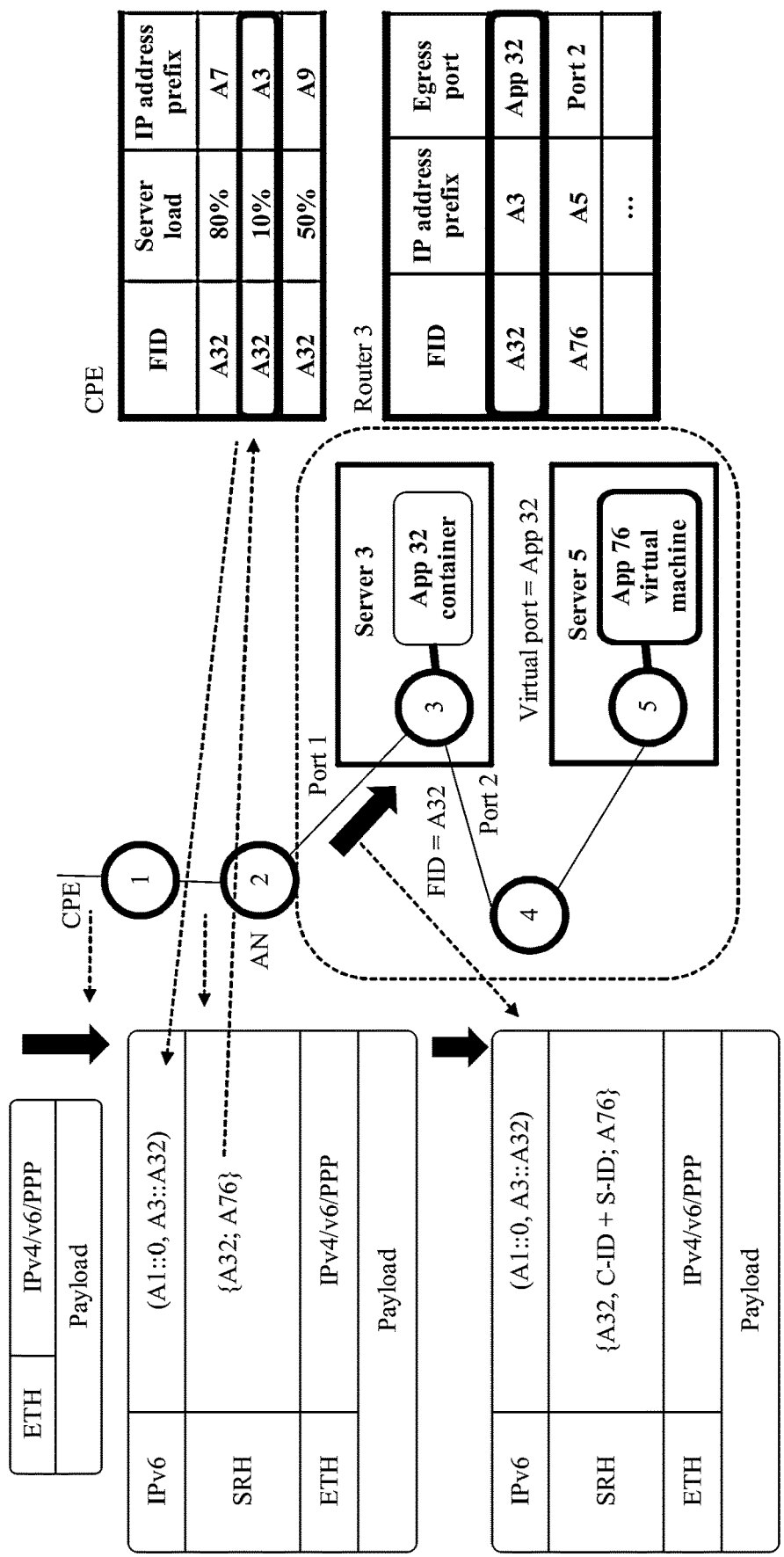
FIG. 17 is a flowchart of a first part of an embodiment of another segment routing method according to this application.

FIG. 17 is a flowchart of a first part of an embodiment of another segment routing method according to this application. As shown in FIG. 17, the method in this embodiment includes the following steps.

S501: A client/user equipment inputs a packet. An IPoE or point-to-point protocol over Ethernet (PPP over Ethernet, PPPoE) packet is used as an example. The packet of the client does not carry a FID. In this case, an ingress router CPE needs to obtain a functional program={A32, A76} from a controller or a network management system, puts the functional program into a functional function list field to form an SR header (SR header, SRH), and searches a RIB of the ingress router based on a FID=A32. It is assumed that a computing status is server load, a route entry is selected based on lightest load. To be specific, a route entry whose IP subnet is A3 is selected, and a FIB entry is generated. The ingress router CPE adds the prefix A3 to the FID=A32 to obtain an IP address, namely, A3:A32 in FIG. 11, and then forwards the packet by using the address as a destination IP address. ETH is Ethernet.

Optionally, an AN performs SR snooping (Snooping), and inserts a corresponding identifier (for example, an S-ID and a C-ID) into the SRH based on a port for receiving a data packet and a service type. The identifier (namely, an S-ID and a C-ID in the figure) is carried in optional type-length-value-object (Optional Type Length Value object) of the SRH. The S-ID and the C-ID are used to replace a service VLAN ID (S-VID) and a customer VLAN ID (C-VID) in a broadband access network.

Figure 18:
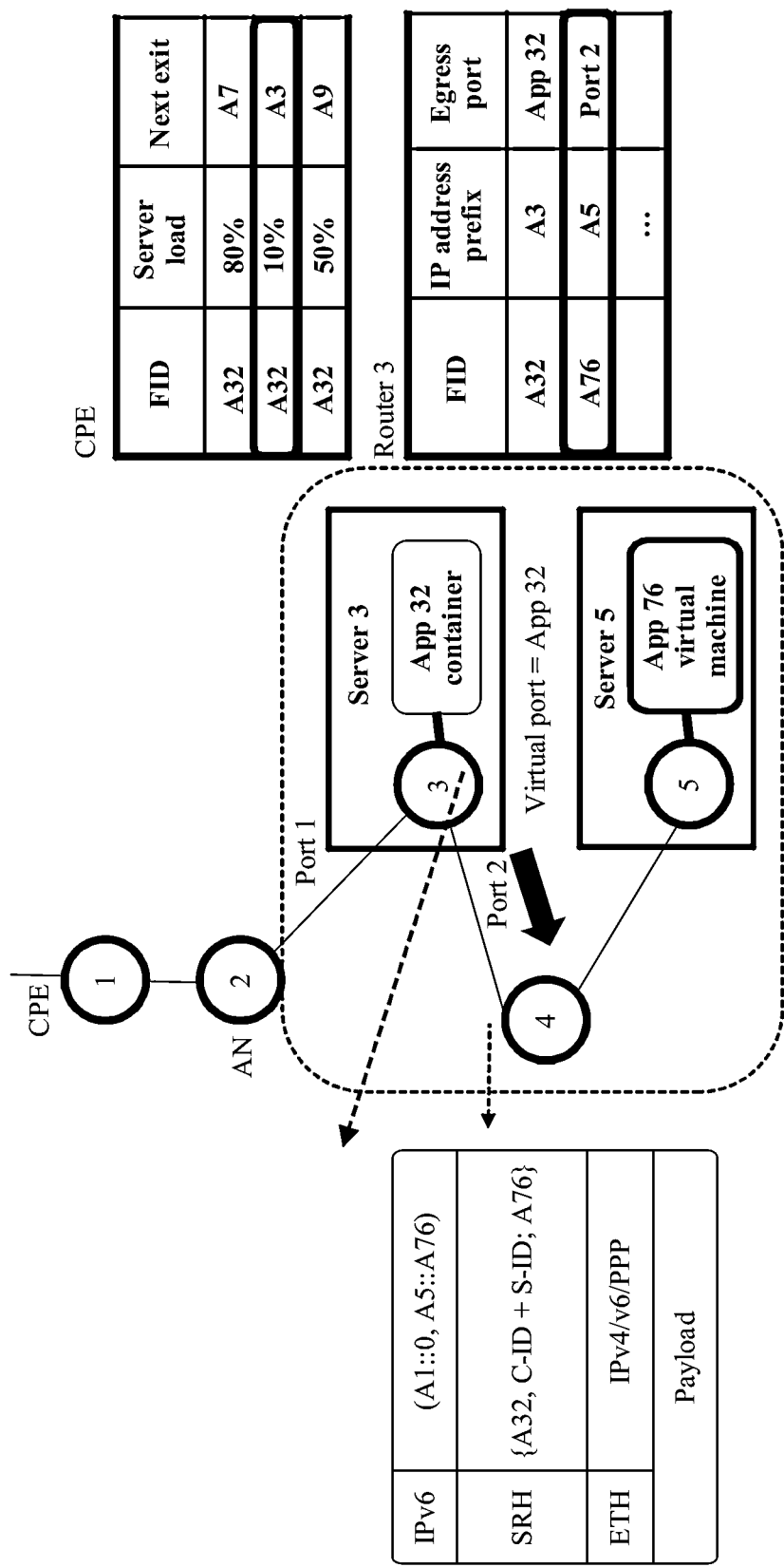
FIG. 18 is a flowchart of a second part of an embodiment of another segment routing method according to this application.

FIG. 18 is a flowchart of a second part of an embodiment of another segment routing method according to this application. As shown in FIG. 18, the method continues.

S502: An egress router (router 3) receives an SR packet, searches the FIB to obtain a virtual port=App 32, and forwards the packet, through an egress port, to an App 32 container for processing of the FID=A32. After the processing is completed, the egress router (router 3)/computing site server 3 removes A32 in the SRH through shifting. Alternatively, an SRH pointer count points to a next FID=A76, and a modified SR packet is forwarded.

S503: An ingress router (router 3) searches the FIB based on the FID=A76 in the SRH to obtain an IP address prefix=A5 and an egress port=a port 2. The ingress router adds the prefix A5 to the FID=A76 to obtain an IP address, namely, A5:A76 in FIG. 12, and then forwards the packet through the port 2 by using the address as a destination IP address.

Figure 19:
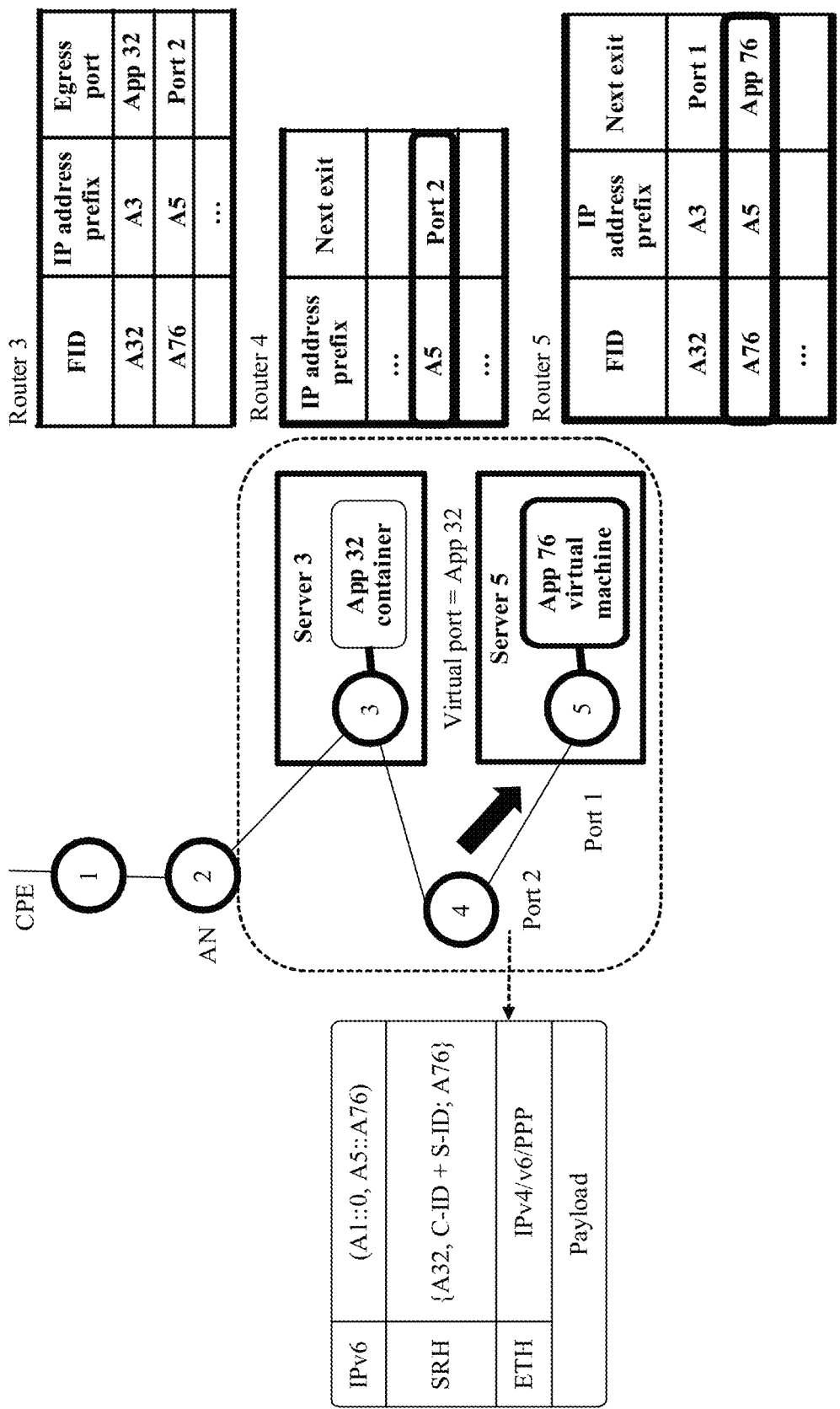
FIG. 19 is a flowchart of a third part of an embodiment of another segment routing method according to this application.

FIG. 19 is a flowchart of a third part of an embodiment of another segment routing method according to this application. As shown in FIG. 19, the method continues.

S504: An intermediate router (router 4) searches the FIB according to a longest prefix matching to obtain the egress port=port 2, and outputs the packet through the port 2.

S505: An egress router (router 5) receives the SR packet, searches the FIB based on the IP address prefix=A5 and/or the FID=A76 to obtain a virtual port=App 76, outputs the packet through the egress port, and forwards the packet to an App 76 container for functional function processing corresponding to the FID=A76. If a functional function corresponding to a FID 1 does not support SRv6, the egress router deletes the FID 1 by shifting a FID 2 field, . . . , and a FID 8 field to the left, and pads 0 after a last bit is shifted, that is, a functional function list={0, 0} is obtained. If the functional function list is all 0s, it indicates that all functional function processing is completed. In this case, an SRv6 extension header that may exist is deleted. If the functional function list corresponding to the FID 1 supports SRv6, the computing site performs the deletion operation.

Figure 20:
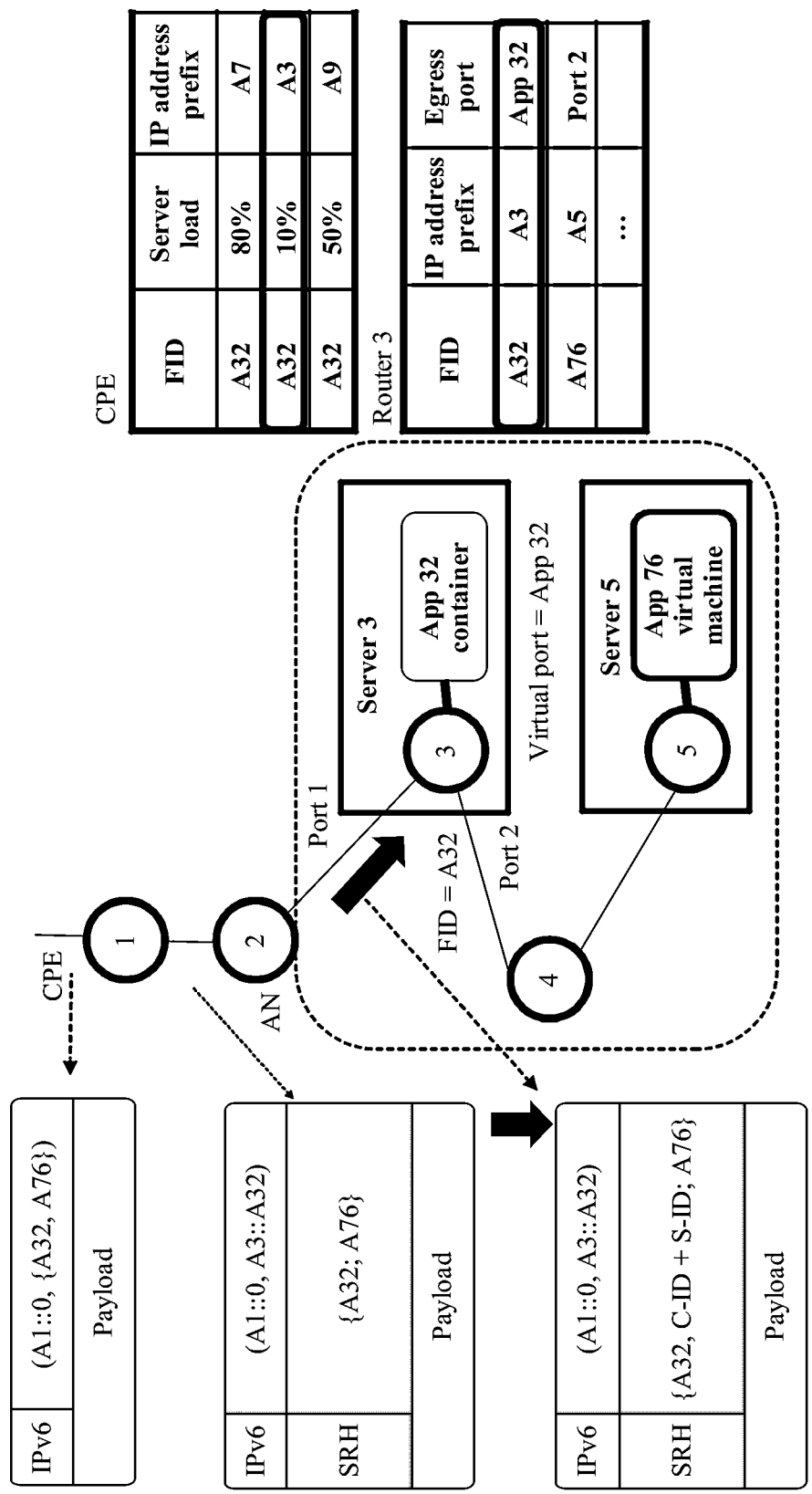
FIG. 20 is a flowchart of a first part of an embodiment of still another segment routing method according to this application.

FIG. 20 is a flowchart of a first part of an embodiment of still another segment routing method according to this application. As shown in FIG. 20, the method in this embodiment includes the following steps.

S601: A client/user equipment outputs a packet. A (IP over Ethernet, IPoE) packet is used as an example. The packet output by the client/user equipment carries a functional program={A32, A76}, and the functional program may be obtained from a DNS system. In this case, an ingress router places the functional program into a functional function list field to form an SR packet header, and searches a RIB of the ingress router based on a FID=A32. It is assumed that a computing status is server load, a route entry is selected based on lightest load. To be specific, a route entry whose IP subnet is A3 is selected, and a FIB entry is generated. The ingress router adds a prefix A3 to the FID=A32 to obtain an IP address, namely, A3:A32 in FIG. 20, and then forwards the packet by using the address as a destination IP address.

Optionally, an AN performs SR snooping, and inserts a corresponding identifier (for example, an S-ID and a C-ID) into the SRH based on a port for receiving a data packet and a service type. The identifier (namely, an S-ID and a C-ID in FIG. 20) is carried in optional type-length-value-object (Optional Type Length Value object) of the SRH. The S-ID and the C-ID are used to replace an S-VID and a C-VID in a broadband access network.

Figure 21:
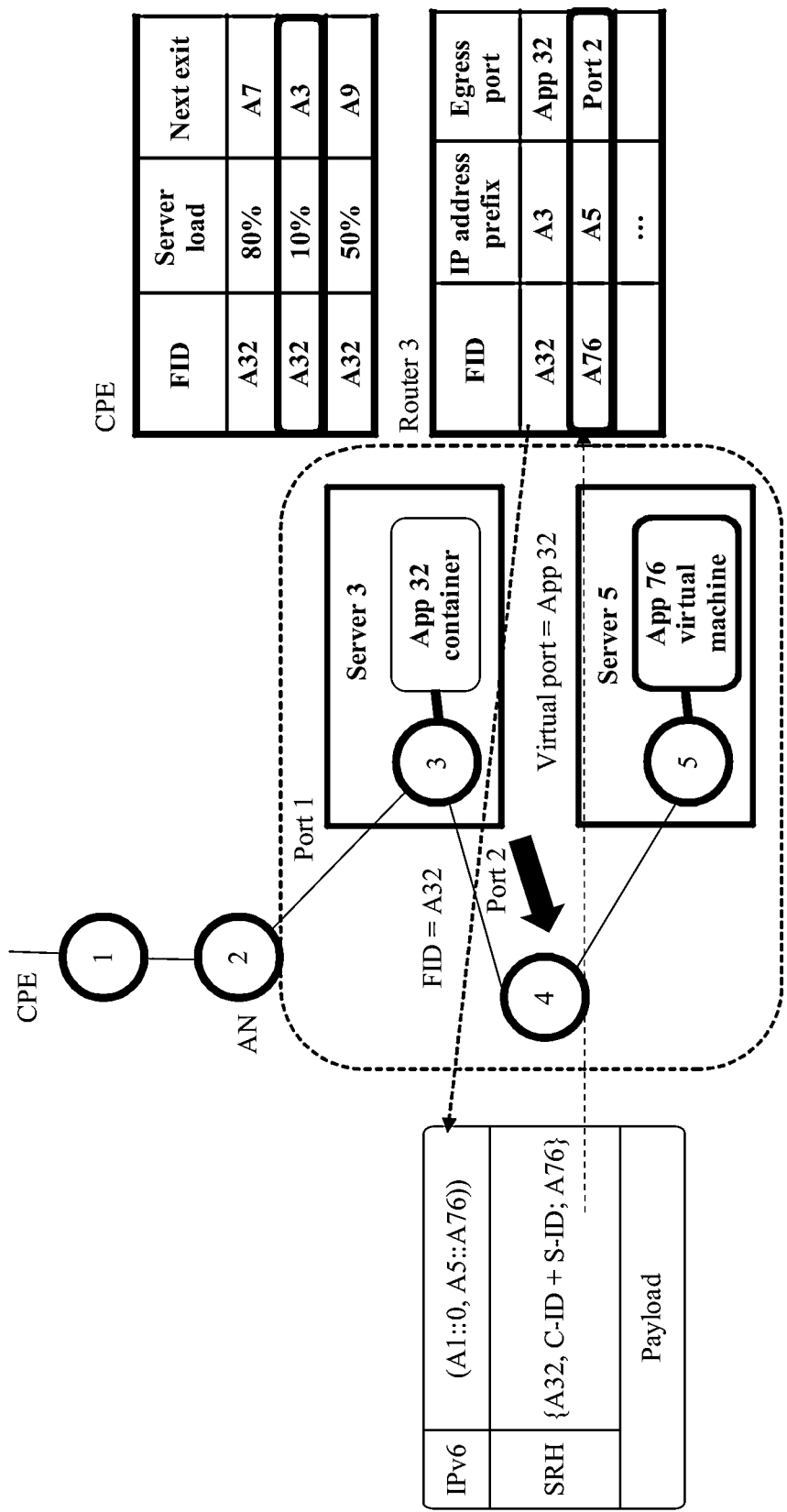
FIG. 21 is a flowchart of a second part of an embodiment of another segment routing method according to this application.

FIG. 21 is a flowchart of a second part of an embodiment of another segment routing method according to this application. As shown in FIG. 21, the method continues.

S602: An egress router (router 3) receives an SR packet, searches the FIB to obtain a virtual port=App 32, and forwards the packet, through an egress port, to an App 32 container for processing of the FID=A32. After the processing is completed, the egress router (router 3)/computing site server 3 removes A32 in the SRH through shifting. Alternatively, an SRH pointer count points to a next FID=A76, and a modified SR packet is forwarded.

S603: An ingress router (router 3) searches the FIB based on the FID=A76 in the SRH to obtain an IP address prefix=A5 and an egress port=a port 2. The ingress router adds the prefix A5 to the FID=A76 to obtain an IP address, namely, A5:A76 in FIG. 21, and then forwards the packet through the port 2 by using the address as a destination IP address.

Figure 22:
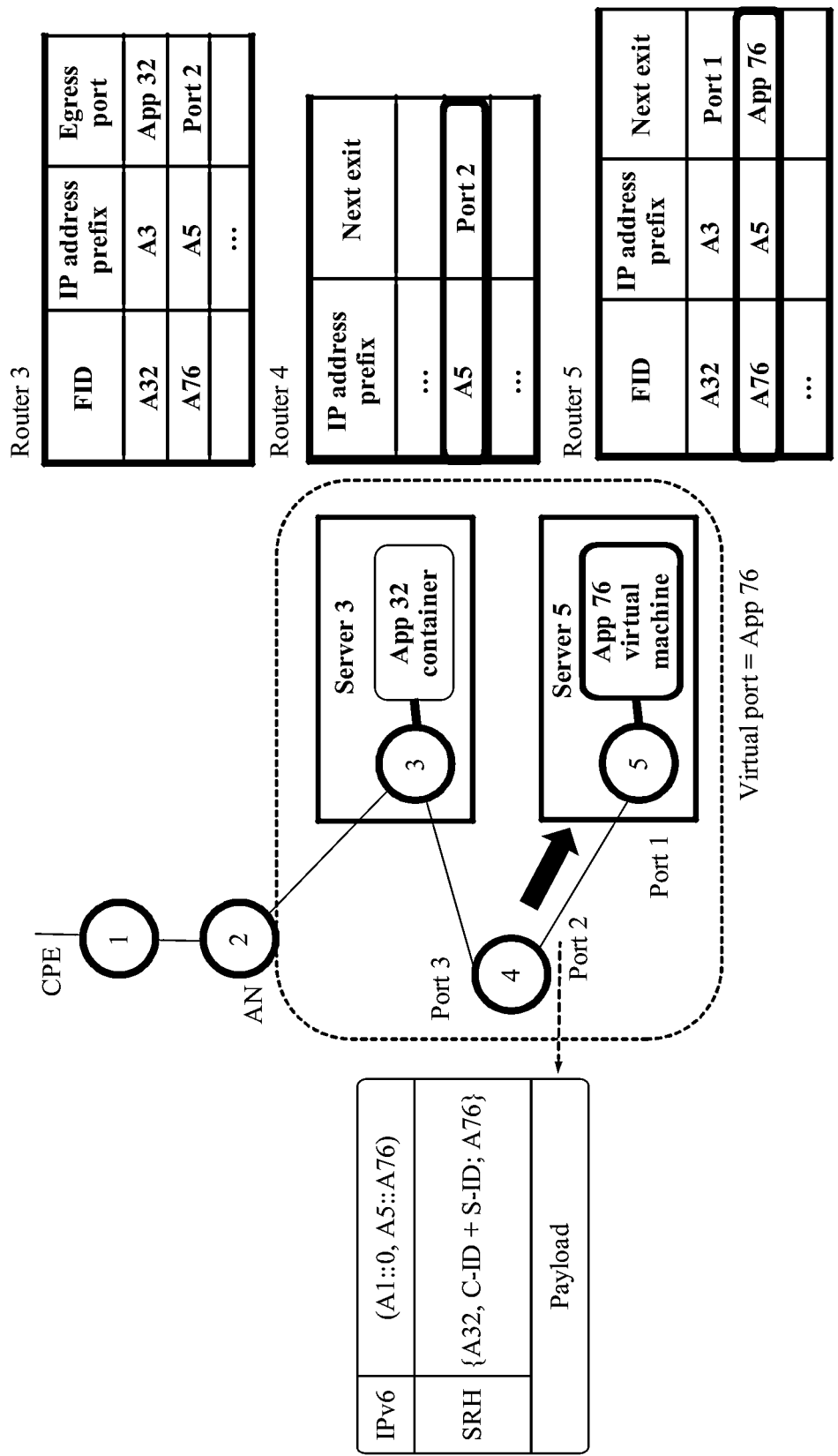
FIG. 22 is a flowchart of a third part of an embodiment of still another segment routing method according to this application.

FIG. 22 is a flowchart of a third part of an embodiment of still another segment routing method according to this application. As shown in FIG. 22, the method continues.

S604: An intermediate router (router 4) searches the FIB according to a longest prefix matching to obtain the egress port=port 2, and outputs the packet through the port 2.

S605: An egress router (router 5) receives the SR packet, searches the FIB based on the IP address prefix=A5 and/or the FID=A76 to obtain a virtual port=App 76, outputs the packet through the egress port, and forwards the packet to an App 76 container for functional function processing corresponding to the FID=A76. If a functional function corresponding to a FID 1 does not support SRv6, the egress router deletes the FID 1 by shifting a FID 2 field, . . . , and a FID 8 field to the left, and pads 0 after a last bit is shifted, that is, a functional function list={0, 0} is obtained. If the functional function list is all 0s, it indicates that all functional function processing is completed. In this case, an SRv6 extension header that may exist is deleted. If the functional function list corresponding to the FID 1 supports SRv6, the computing site performs the deletion operation.

Figure 23:
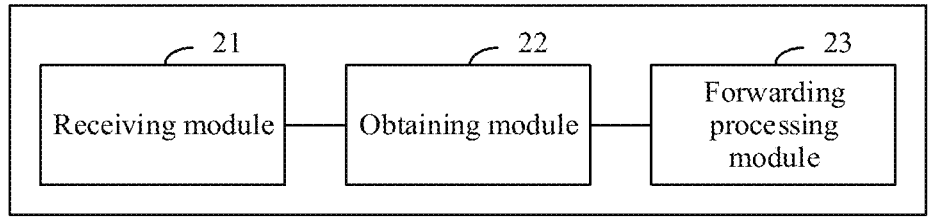
FIG. 23 is a schematic diagram of a structure of an embodiment of a segment routing apparatus according to this application.

FIG. 23 is a schematic diagram of a structure of an embodiment of a segment routing apparatus according to this application. As shown in FIG. 23, the apparatus in this embodiment may include a receiving module 21, an obtaining module 22, and a forwarding processing module 23. The receiving module 21 is configured to receive a packet of a terminal device.

The obtaining module 22 is configured to obtain a functional program corresponding to the packet of the terminal device. The functional program is used to indicate one or more sequential computing processing steps/instructions, service processing steps/instructions, or network processing steps/instructions, the functional program includes one or more sequentially placed function identifiers FIDs, and each FID is used to represent one computing processing step/instruction, service processing step/instruction, or network processing step/instruction.

The forwarding processing module 23 is configured to: determine, based on a forwarding information base FIB or a routing information base RIB, one of an IP address prefix, an egress routing device address, or an egress port corresponding to a sequentially placed first FID, and forward the packet based on the determined one of the IP address prefix, the egress routing device address, or the egress port.

Further, the packet of the terminal device does not carry a FID, and the obtaining module 22 is configured to:

obtain, from a controller/network management system, the functional program corresponding to the packet of the terminal device, and place the obtained functional program into the packet.

Further, the packet of the terminal device carries a FID, and the obtaining module 22 is configured to:

The ingress routing device obtains the functional program from the packet of the terminal device. The functional program is obtained by the terminal device from a response packet sent by a domain name server DNS and placed into the packet, and the response packet is sent by the DNS based on a received request packet that carries a universal resource identifier URI, an application software name, or a service name.

Further, the functional program is placed into the IPv6 extension header; or the functional program is placed into a destination address field of an IPv6 packet header or the destination address field in the IPv6 packet header and the IPv6 extension header.

Further, computing-related data used by the functional program is placed into a payload field or the IPv6 extension header, or computing-related data used by the functional program is placed into a payload field or the IPv6 extension header.

Further, the forwarding processing module 23 is configured to:

search the FIB or the RIB for an IP address prefix corresponding to the FID; and add the IP address prefix to the FID to obtain an IP address, and forward the packet by using the IP address as a destination IP address, replace the FID with the IP address prefix corresponding to the FID, and forward the packet based on the IP address prefix, or store the FID in another field other than a destination address of an IP packet header, replace the FID with the IP address prefix corresponding to the FID, and forward the packet based on the IP address prefix;

search the FIB or the RIB for an egress routing device address corresponding to the FID, add tunnel encapsulation to the packet by using the egress routing device address as a tunnel destination address, and send, by the ingress routing device, the packet to which the tunnel encapsulation is added to an egress routing device; or search the FIB or the RIB for an egress port corresponding to the FID, and output the packet based on the egress port.

Further, the FIB includes: a correspondence between a FID, and an output IP address prefix and an egress port, a correspondence between a FID, and an egress routing device address and an egress port, or a correspondence between a FID and an egress port.

The RIB includes: a correspondence between a FID, and a computing metric value, an output IP address prefix, and an egress port, a correspondence between a FID, and a computing metric value, an egress routing device address, and an egress port, or a correspondence between a FID, and a computing metric value and an egress port.

The apparatus in this embodiment may be used to execute the technical solutions of the method embodiment shown in FIG. 5. The implementation principles and technical effects are similar, and are not described herein again.

Figure 24:
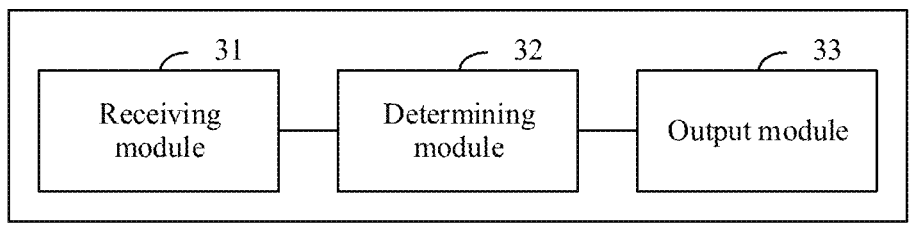
FIG. 24 is a schematic diagram of a structure of an embodiment of a segment routing apparatus according to this application.

FIG. 24 is a schematic diagram of a structure of an embodiment of a segment routing apparatus according to this application. As shown in FIG. 24, the apparatus in this embodiment may include a receiving module 31, a determining module 32, and an output module 33.

The receiving module 31 is configured to receive a packet from an ingress routing device or an intermediate routing device. The packet carries a functional program, the functional program is used to indicate one or more sequential computing processing steps/instructions, service processing steps/instructions, or network processing steps/instructions, the functional program includes one or more sequentially placed function identifiers FIDs, and each FID is used to represent one computing processing step/instruction, service processing step/instruction, or network processing step/instruction.

The determining module 32 is configured to determine, based on a forwarding information base FIB or a routing information base RIB, an egress port corresponding to a first sequentially placed FID and/or an egress port corresponding to an IP address prefix corresponding to the FID.

The output module 33 is configured to output the packet to a computing container through the egress port, to enable the computing container to perform functional function processing corresponding to the FID, where the computing container is a server, a computing site, a virtual machine, or a container.

The apparatus in this embodiment may be used to execute the technical solutions of the method embodiment shown in FIG. 10. The implementation principles and technical effects are similar, and are not described herein again.

Figure 25:
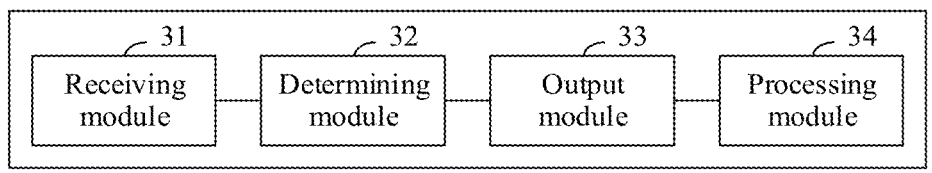
FIG. 25 is a schematic diagram of a structure of an embodiment of a segment routing apparatus according to this application.

FIG. 25 is a schematic diagram of a structure of an embodiment of a segment routing apparatus according to this application. As shown in FIG. 25, based on the structure of the apparatus shown in FIG. 24, the apparatus in this embodiment may further include a processing module 34. The processing module 34 is configured to: shift the plurality of FIDs included in the functional program, delete a processed FID, and pad 0 after a last bit is shifted; or shift the plurality of FIDs included in the functional program, delete a processed FID, pad 0 after a last bit is shifted, and delete an IPv6 extension header in which the functional program is located after functional function processing corresponding to all the FIDs is completed.

Figure 26:
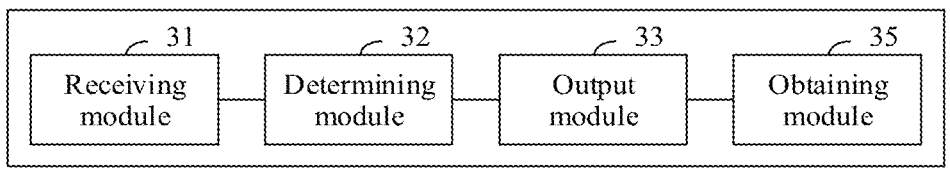
FIG. 26 is a schematic diagram of a structure of an embodiment of a segment routing apparatus according to this application.

FIG. 26 is a schematic diagram of a structure of an embodiment of a segment routing apparatus according to this application. As shown in FIG. 26, based on the structure of the apparatus shown in FIG. 24, the apparatus in this embodiment may further include an obtaining module 35. The obtaining module 35 is configured to: obtain the hash value carried in the packet, and search, based on the hash value, an IP address prefix and/or an egress port that are/is of a hash table stored by an egress routing device and that are/is corresponding to the hash value.

Further, the FIB includes: a correspondence between a FID, and an input IP address prefix and an egress port, a correspondence between a FID and an egress port, or a correspondence between a FID and a hash table-related parameter, where the hash table-related parameter includes a start location and/or a total quantity of entries in a hash table.

The RIB includes: a correspondence between a FID, and a computing metric value, an input IP address prefix, and an egress port, a correspondence between a FID, and a computing metric value and an egress port, or a correspondence between a FID, and a computing metric value and a hash table-related parameter, where the hash table-related parameter includes a start location and/or a total quantity of entries in a hash table.

Further, the functional program is placed into the IPv6 extension header; or the functional program is placed into a destination address field of an IPv6 packet header or the destination address field in the IPv6 packet header and the IPv6 extension header.

Further, computing-related data used by the functional program is placed into a payload field or the IPv6 extension header, or computing-related data used by the functional program is placed into a payload field or the IPv6 extension header.

The apparatus in this embodiment may be used to execute the technical solutions of the method embodiment shown in FIG. 10. The implementation principles and technical effects are similar, and are not described herein again.

Figure 27:
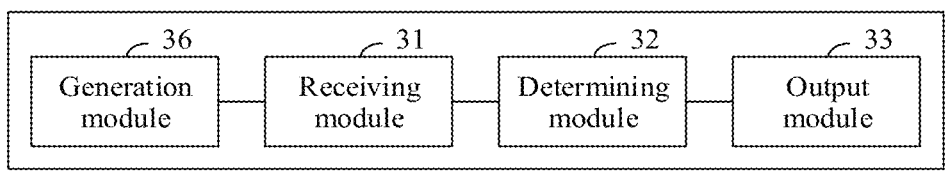
FIG. 27 is a schematic diagram of a structure of an embodiment of a segment routing apparatus according to this application.

FIG. 27 is a schematic diagram of a structure of an embodiment of a segment routing apparatus according to this application. As shown in FIG. 27, based on the structure of the apparatus shown in FIG. 24, the apparatus in this embodiment may further include a generation module 36. The generation module 36 is configured to: obtain, from a virtual router running in the computing container, a FID or an IP address prefix of a functional function instance supported by the computing container, or an egress routing device address, and a computing capacity or a computing status of the computing container;

generate a corresponding computing metric value based on the computing capacity or the computing status of the computing container;

generate the RIB based on the computing metric value, and the FID or the IP address prefix of the functional function instance supported by the computing container, or the egress routing device address; and generate the FIB based on the RIB.

In this application, function module division may be performed on the segment routing apparatus based on the foregoing method example. For example, function modules may be obtained through division corresponding to functions, or two or more functions may be integrated into one processing module. The integrated module may be implemented in a form of hardware, or may be implemented in a form of a software function module. It should be noted that, in embodiments of this application, the module division is used as an example, and is merely a logical function division. In an actual implementation, another division manner may be used.

Figure 28:
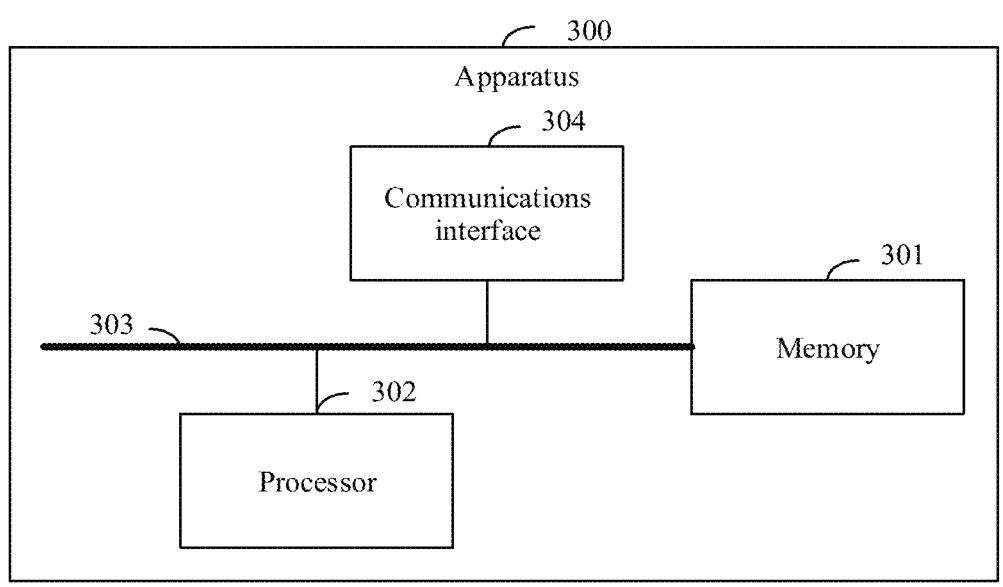
FIG. 28 is a schematic diagram of a structure of an apparatus according to this application.

FIG. 28 is a schematic diagram of a structure of an apparatus according to this application. As shown in FIG. 28, the apparatus 300 includes a memory 301 and a processor 302.

The memory 301 is configured to store a computer program.

The processor 302 is configured to execute the computer program stored in the memory, to implement the segment routing method in the foregoing embodiments. For details, refer to related description in the foregoing method embodiments.

Optionally, the memory 301 may be independent, or may be integrated with the processor 302.

When the memory 301 is a component independent of the processor 302, the apparatus 300 may further include:

a bus 303, configured to connect the memory 301 and the processor 302.

Optionally, this embodiment further includes a communications interface 304. The communications interface 304 may be connected to the processor 302 through the bus 303. The processor 302 may control the communications interface 304 to implement the foregoing receiving and sending functions of the apparatus 300.

The apparatus may be configured to perform steps and/or procedures corresponding to the ingress routing device or the egress routing device in the foregoing method embodiments.

This application further provides a readable storage medium. The readable storage medium stores executable instructions. When at least one processor of the foregoing apparatus executes the executable instructions, a terminal device performs the segment routing method in the foregoing method embodiments.

A person of ordinary skill in the art may understand that all or some of the foregoing embodiments may be implemented by using software, hardware, firmware, or any combination thereof. When the software is used to implement embodiments, all or a part of embodiments may be implemented in a form of a computer program product. The computer program product includes one or more computer instructions. When the computer program instructions are loaded and executed on a computer, the procedures or functions according to embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

What is claimed is:

1. A segment routing method, comprising:

receiving, by an ingress routing device, a packet from a terminal device;

obtaining, by the ingress routing device, a functional program corresponding to the packet of the terminal device, wherein the functional program indicates one or more sequential computing processing steps/instructions, service processing steps/instructions, or network processing steps/instructions, the functional program comprises one or more sequentially placed function identifiers (FIDs), and each FID represents one computing processing step/instruction, service processing step/instruction, or network processing step/instruction;

determining, by the ingress routing device based on a forwarding information base (FIB) or a routing information base (RIB), one of an internet protocol (IP)

address prefix, an egress routing device address, or an egress port corresponding to a sequentially placed first FID; and forwarding the packet based on the determined one of the IP address prefix, the egress routing device address, or the egress port.

2. The method according to claim 1, wherein the packet of the terminal device does not carry a FID, and the obtaining the functional program corresponding to the packet of the terminal device comprises:

obtaining, by the ingress routing device from a controller/network management system, the functional program corresponding to the packet of the terminal device, and placing the obtained functional program into the packet.

3. The method according to claim 1, wherein the packet of the terminal device carries a FID, and the obtaining the functional program corresponding to the packet of the terminal device comprises:

obtaining, by the ingress routing device, the functional program from the packet of the terminal device.

4. The method according to claim 2, wherein
the functional program is placed into an internet protocol version 6 (IPv6) extension header, or
the functional program is placed into a destination address field of an IPv6 packet header, or
the functional program is placed into the destination address field of an IPv6 packet header and the IPv6 extension header.

5. The method according to claim 4, wherein computing-related data used by the functional program is placed into a payload field or the IPv6 extension header.

6. The method according to claim 1, wherein the determining steps performed by the ingress routing device comprises:

searching the FIB or the RIB for an IP address prefix corresponding to the FID; and
adding the IP address prefix to the FID to obtain an IP address, and forwarding the packet by using the IP address as a destination IP address;
searching the FIB or the RIB for an egress routing device address corresponding to the FID, adding tunnel encapsulation to the packet by using the egress routing device address as a tunnel destination address, and sending the packet to which the tunnel encapsulation is added to an egress routing device; or
searching the FIB or the RIB for an egress port corresponding to the FID, and outputting the packet based on the egress port.

7. The method according to claim 6, wherein before the forwarding the packet by using the IP address as the destination IP address the method further comprises:

performing a hash operation based on a multi-tuple to obtain a hash value, and placing the hash value into another field of the IPv6 extension header or another field, other than the destination address, of the IPv6 packet header; or
obtaining a hash value carried in the packet, and searching, based on the hash value, an output IP address prefix, an egress routing device address, or an egress port that is of a hash table stored by the ingress routing device and that is corresponding to the hash value.

8. The method according to claim 1, wherein
the FIB comprises: a correspondence between a FID, and an output IP address prefix and an egress port, a correspondence between a FID, and an egress routing device address and an egress port, a correspondence between a FID and an egress port, or a correspondence between a FID and a hash table-related parameter, wherein the hash table-related parameter comprises a start location and/or a total quantity of entries in a hash table, and the RIB comprises: a correspondence between a FID, and a computing metric value, an output IP address prefix, and an egress port, a correspondence between a FID, and a computing metric value, an egress routing device address, and an egress port, a correspondence between a FID, and a computing metric value and an egress port, or a correspondence between a FID and a hash table-related parameter, wherein the hash table-related parameter comprises a start location and/or a total quantity of entries in a hash table.

9. The method according to claim 1, further comprising:
obtaining, by the ingress routing device from a computing container,
a FID or an IP address prefix of a functional function instance supported by the computing container or an egress routing device address, and
a computing capacity or a computing status of the computing container, wherein the computing container is a server, a computing site, a virtual machine, or a container;
generating, by the ingress routing device, a corresponding computing metric value based on the computing capacity or the computing status of the computing container;
generating, by the ingress routing device, the RIB based on the computing metric value, and the FID or the IP address prefix of the functional function instance supported by the computing container, or the egress routing device address; and
generating, by the ingress routing device, the FIB based on the RIB.

10. A segment routing method, comprising:
receiving, by an egress routing device, a packet from an ingress routing device or an intermediate routing device, wherein the packet carries a functional program, the functional program indicates one or more sequential computing processing steps/instructions, service processing steps/instructions, or network processing steps/instructions, the functional program comprises one or more sequentially placed function identifiers (FIDs), and each FID represents one computing processing step/instruction, service processing step/instruction, or network processing step/instruction;
determining, by the egress routing device based on a forwarding information base (FIB) or a routing information base (RIB), an egress port corresponding to a first sequentially placed FID and/or an egress port corresponding to an internet protocol (IP) address prefix corresponding to the FID; and
outputting, by the egress routing device, the packet to a computing container through the egress port, to enable the computing container to perform functional function processing corresponding to the FID, wherein the computing container is a server, a computing site, a virtual machine, or a container.

11. The method according to claim 10, wherein the method further comprises:
shifting, by the egress routing device, the plurality of FIDs comprised in the functional program, deleting a processed FID, and padding 0 after a last bit is shifted; or
shifting, by the egress routing device, the plurality of FIDs comprised in the functional program, deleting a processed FID, padding 0 after a last bit is shifted, and deleting an IPv6 extension header in which the functional program is located after functional function processing corresponding to all the FIDs is completed.

12. The method according to claim 10, wherein if the packet carries a hash value, the method further comprises:
obtaining, by the egress routing device, the hash value carried in the packet, and searching, based on the hash value, an IP address prefix and/or an egress port that are/is of a hash table stored by the egress routing device and that are/is corresponding to the hash value.

13. The method according to claim 10, wherein
the FIB comprises: a correspondence between a FID, and an input IP address prefix and an egress port, a correspondence between a FID and an egress port, or a correspondence between a FID and a hash table-related parameter, wherein the hash table-related parameter comprises a start location and/or a total quantity of entries in a hash table; and
the RIB comprises: a correspondence between a FID, and a computing metric value, an input IP address prefix, and an egress port, a correspondence between a FID, and a computing metric value and an egress port, or a correspondence between a FID, and a computing metric value and a hash table-related parameter, wherein the hash table-related parameter comprises a start location and/or a total quantity of entries in a hash table.

14. The method according to claim 10, wherein
the functional program is placed into an internet protocol version (IPv6) extension header; or
the functional program is placed into a destination address field of an IPv6 packet header, or
the functional program is placed into the destination address field of an IPv6 packet header and the IPv6 extension header.

15. The method according to claim 14, wherein computing-related data used by the functional program is placed into a payload field or the IPv6 extension header; or
computing-related data used by the functional program is placed into a payload field or the IPv6 extension header.

16. A segment routing apparatus, comprising:
one or more processors; and
a non-transitory computer-readable memory coupled to the one or more processors and storing a program to be executed by the one or more processors, the program including instructions that, when executed by the one or more processors, cause the segment routing apparatus to:
receive a packet from a terminal device;
obtain a functional program corresponding to the packet of the terminal device, wherein the functional program indicates one or more sequential computing processing steps/instructions, service processing steps/instructions, or network processing steps/instructions, the functional program comprises one or more sequentially placed function identifiers (FIDs), and each FID represents one computing processing step/instruction, service processing step/instruction, or network processing step/instruction; and
determine, based on a forwarding information base (FIB) or a routing information base (RIB), one of an internet protocol (IP) address prefix, an egress routing device address, or an egress port corresponding to a sequentially placed first FID, and forward the packet based on the determined one of the IP address prefix, the egress routing device address, or the egress port.

17. The apparatus according to claim 16, wherein the program further includes instructions that, when executed by the one or more processors, cause the segment routing apparatus to:
obtain, from a controller/network management system, the functional program corresponding to the packet of the terminal device, and place the obtained functional program into the packet.

18. The apparatus according to claim 16, wherein the program further includes instructions that, when executed by the one or more processors, cause the segment routing apparatus to:
obtain the functional program from the packet of the terminal device, wherein the functional program is obtained by the terminal device from a response packet from a domain name server DNS and placed into the packet, and the response packet from the DNS based on a received request packet that carries a universal resource identifier URI, an application software name, or a service name.

19. The apparatus according to claim 17, wherein
the functional program is placed into an IPv6 extension header; or
the functional program is placed into a destination address field of an IPv6 packet header, or
the functional program is placed into the destination address field in the IPv6 packet header and the IPv6 extension header.

20. The apparatus according to claim 19, wherein computing-related data used by the functional program is placed into a payload field or the IPv6 extension header; or
computing-related data used by the functional program is placed into a payload field or the IPv6 extension header.

* * * * *